(12) United States Patent
Santini

(10) Patent No.: US 6,339,523 B1
(45) Date of Patent: *Jan. 15, 2002

(54) WRITE HEAD BEFORE READ HEAD CONSTRUCTED MAGNETIC HEAD WITH TRACK WIDTH AND ZERO THROAT HEIGHT DEFINED BY FIRST POLE TIP

(75) Inventor: Hugo Alberto Emilio Santini, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/592,088

(22) Filed: Jun. 12, 2000

Related U.S. Application Data

(63) Continuation of application No. 09/058,521, filed on Apr. 10, 1998, now Pat. No. 6,130,809.

(51) Int. Cl.[7] .............................. G11B 5/39; G11B 5/147
(52) U.S. Cl. ........................................ 360/317; 360/126
(58) Field of Search ................................ 360/317, 125, 360/126

(56) References Cited

U.S. PATENT DOCUMENTS

| | | | | |
|---|---|---|---|---|
| 4,949,207 A | | 8/1990 | Lazzari ........................ | 360/119 |
| 5,097,371 A | * | 3/1992 | Somers ........................ | 360/113 |
| 5,155,646 A | * | 10/1992 | Fujisawa et al. ............. | 360/126 |
| 5,267,112 A | | 11/1993 | Batra et al. ................... | 360/119 |
| 5,285,340 A | * | 2/1994 | Ju et al. ....................... | 360/119 |
| 5,325,254 A | * | 6/1994 | Cooperrider ................. | 360/126 |
| 5,452,164 A | * | 9/1995 | Cole et al. .................... | 360/113 |
| 5,473,491 A | * | 12/1995 | Fujisawa et al. ............. | 360/126 |
| 5,535,079 A | | 7/1996 | Fukazawa et al. ........... | 360/126 |
| 5,649,351 A | | 7/1997 | Cole et al. ................. | 29/603.14 |
| 5,652,687 A | * | 7/1997 | Chen et al. ................... | 360/126 |
| 5,668,689 A | | 9/1997 | Schultz et al. ............... | 360/113 |
| 5,691,867 A | * | 11/1997 | Onuma et al. ............... | 360/126 |
| 5,710,683 A | * | 1/1998 | Sundaram .................... | 360/126 |
| 5,719,730 A | * | 2/1998 | Chang et al. ................. | 360/113 |
| 5,726,841 A | * | 3/1998 | Tong et al. ................... | 360/122 |
| 5,793,578 A | * | 8/1998 | Heim et al. .................. | 360/126 |
| 5,802,700 A | * | 9/1998 | Chen et al. ................ | 29/603.14 |
| 5,805,391 A | * | 9/1998 | Chang et al. ................. | 360/113 |
| 5,822,153 A | * | 10/1998 | Lairson et al. ............... | 360/104 |
| 5,831,801 A | * | 11/1998 | Shouji et al. ................. | 360/126 |
| 6,130,809 A | * | 10/2000 | Santini ......................... | 360/317 |

* cited by examiner

Primary Examiner—William Klimowicz
(74) Attorney, Agent, or Firm—Ervin F. Johnston

(57) ABSTRACT

The present invention provides a merged magnetic head and method of making wherein a write portion of the magnetic head is constructed before the read head portion and the first pole tip of the write head defines the track width and zero throat height of the magnetic head. During construction, each insulation layer of an insulation stack is planarized with components of a partially completed first pole piece, thereby promoting highly effective construction of one or more coil layers and the first pole tip of the write head. The insulation stack is recessed with respect to the top surface of the first pole tip so that the insulation stack has substantially no impact on photoresist patterning of the first pole tip. Insulation layers of the stack extend into the field beyond side edges of the first pole piece layer so as to provide planar support for the one or more coil layers. The second pole piece/first shield layer is constructed on a flat surface followed by a first read gap layer, read sensor, first and second lead layers a second read gap layer and a second shield layer, which are all planar. The lowering of the insulation stack with respect to the top surface of the first pole tip causes the write gap to be closer to the read gap so as to minimize misregistration of the read and write heads when they are located over an outer track on a magnetic disk.

11 Claims, 26 Drawing Sheets

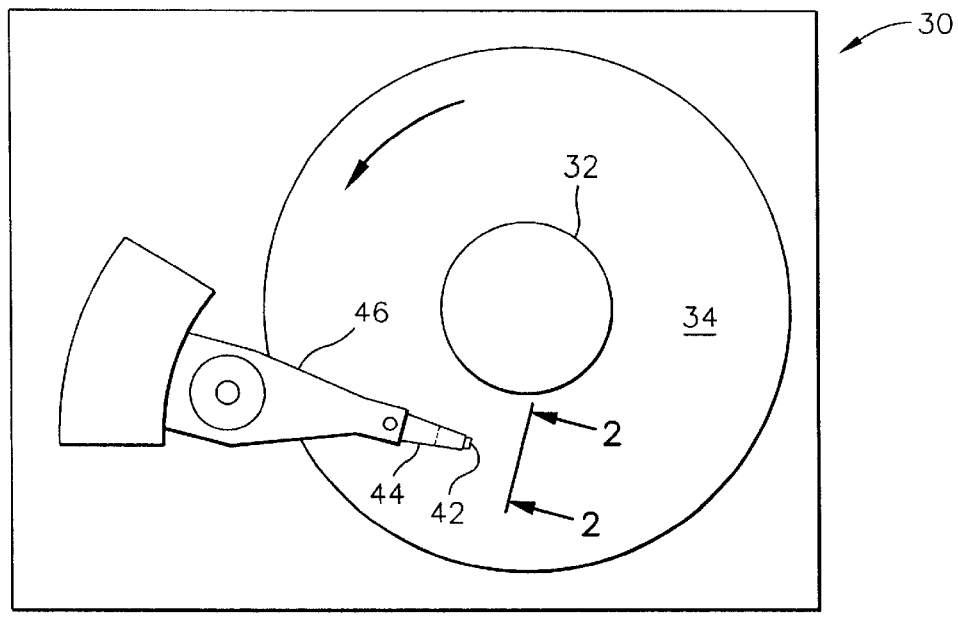
FIG. 1
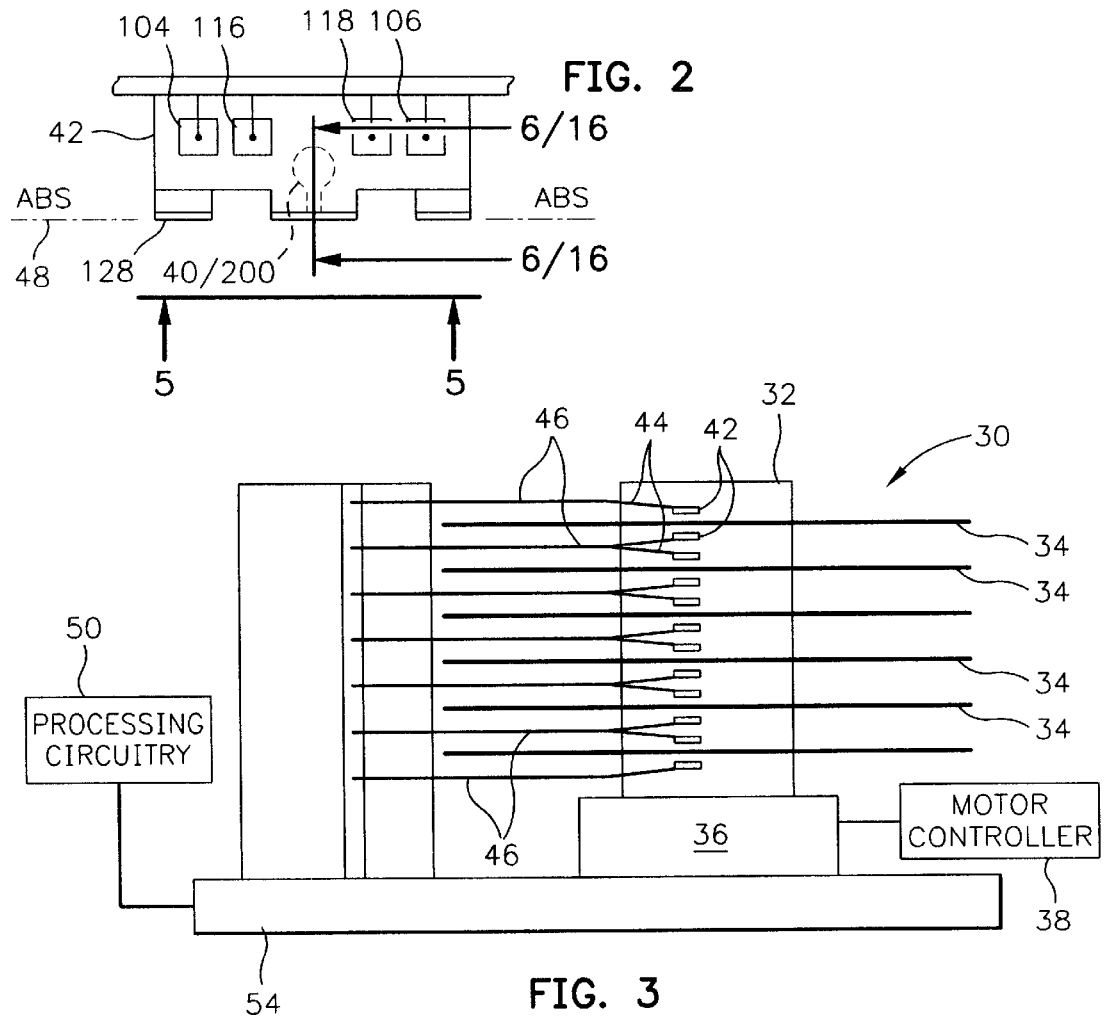
FIG. 2
FIG. 3

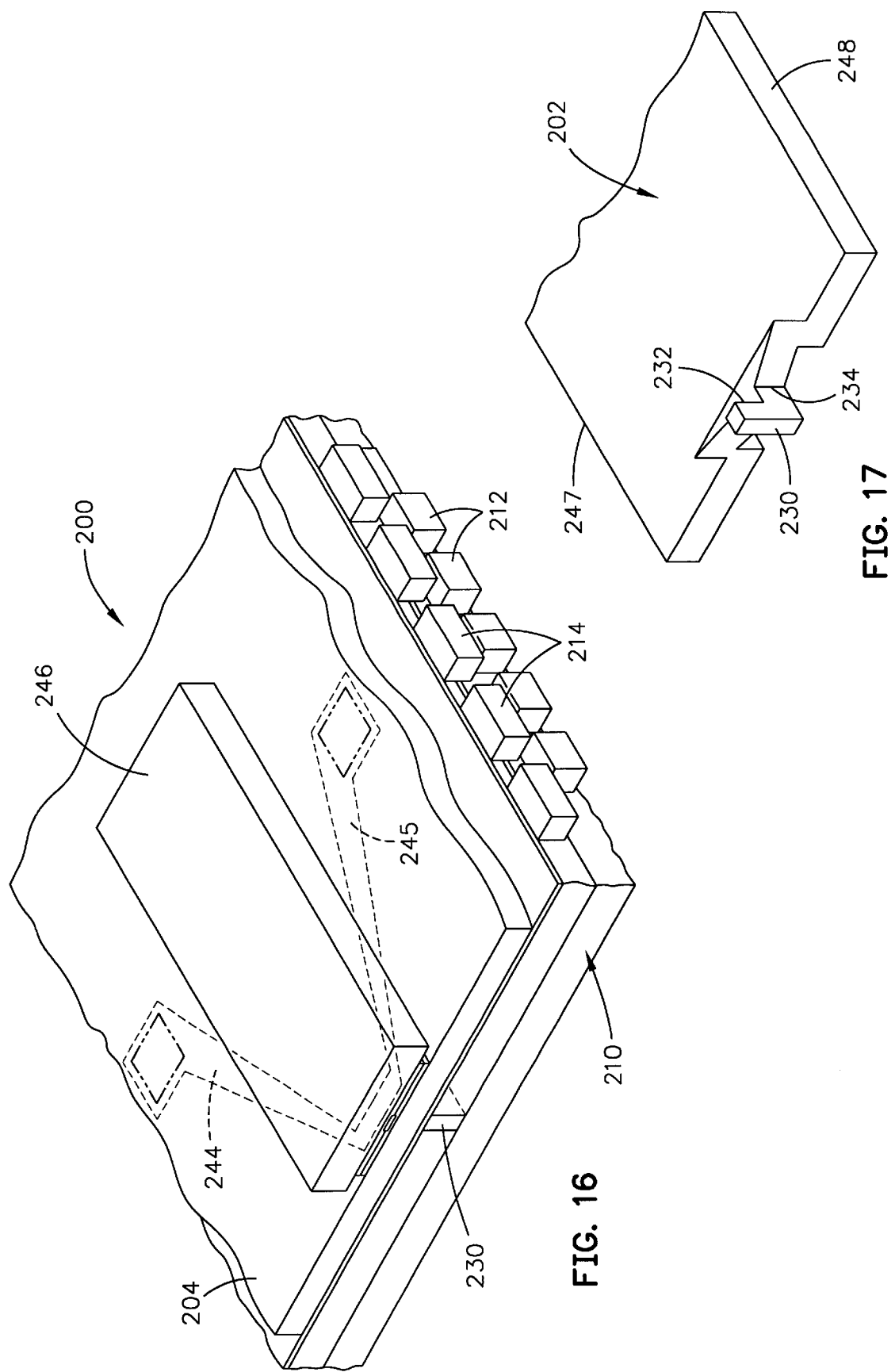

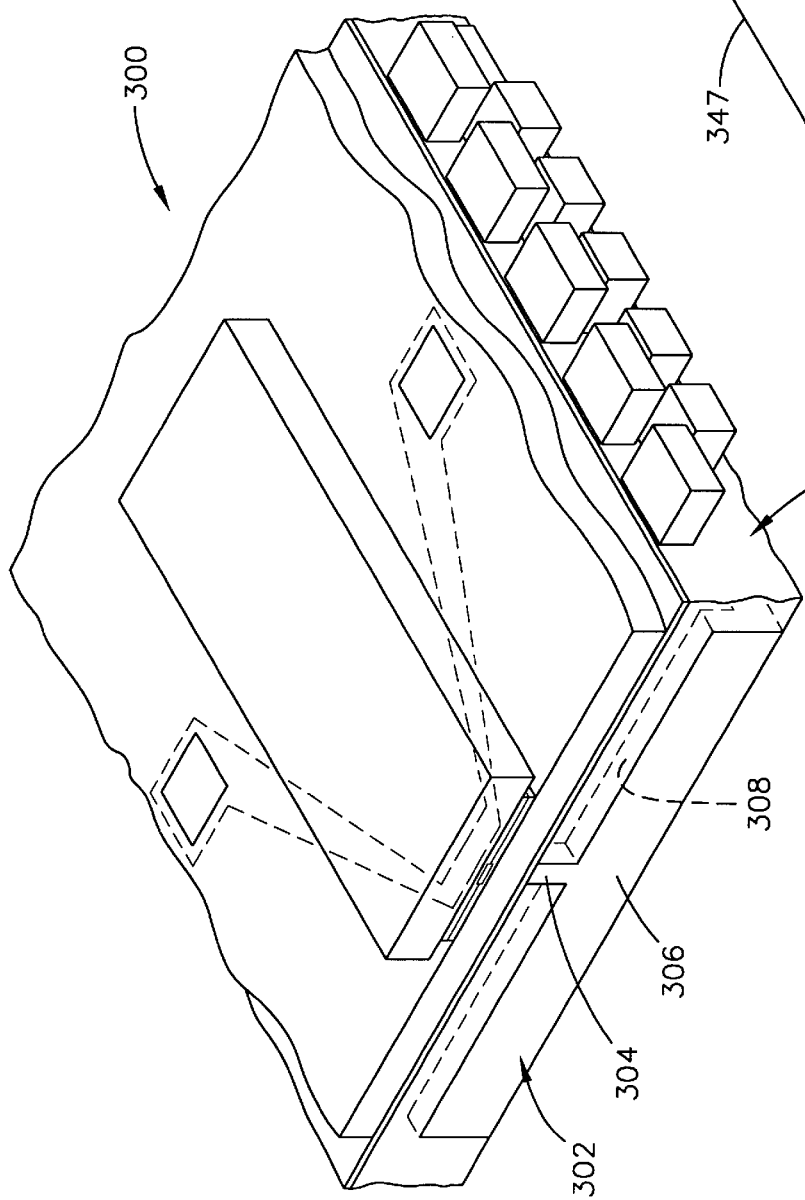
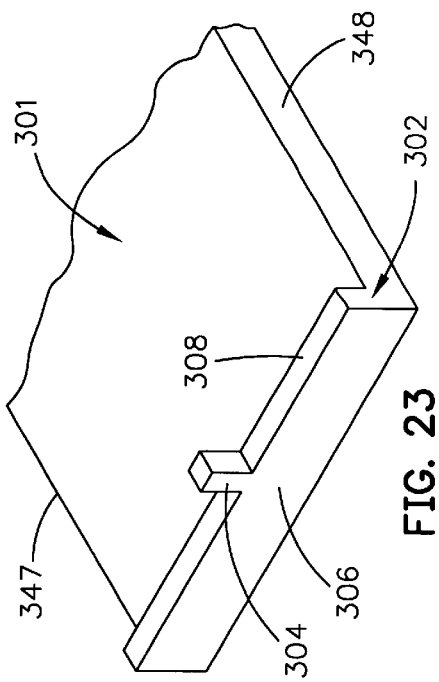
FIG. 22
FIG. 23

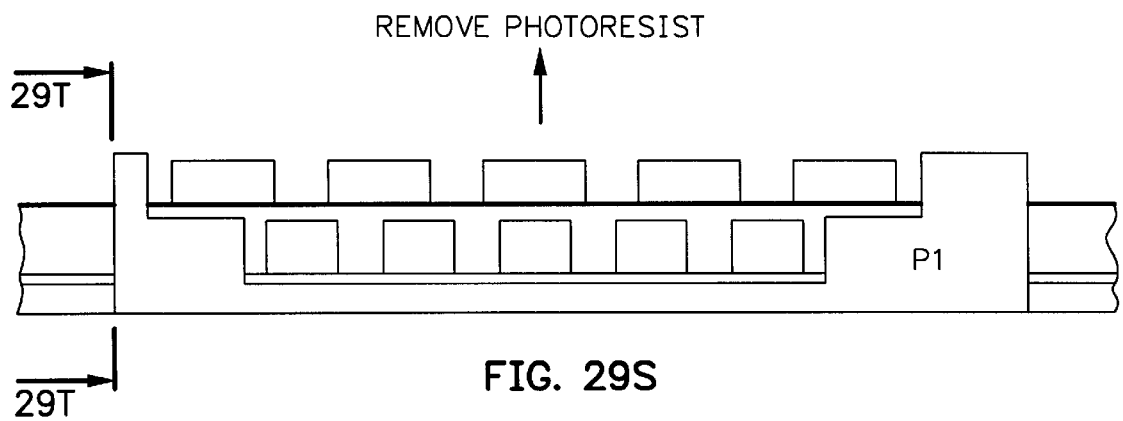
FIG. 29S
FIG. 29T
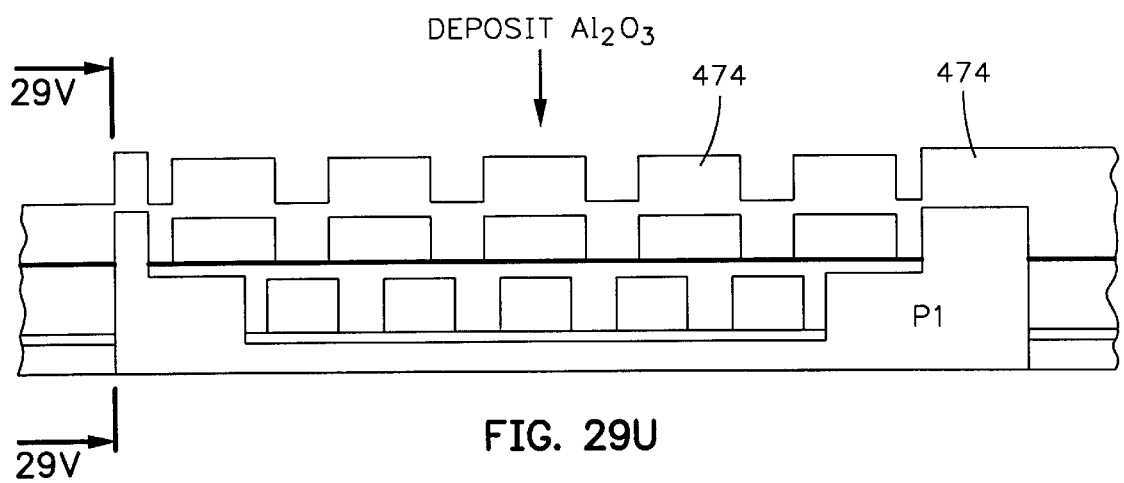
FIG. 29U

WRITE HEAD BEFORE READ HEAD CONSTRUCTED MAGNETIC HEAD WITH TRACK WIDTH AND ZERO THROAT HEIGHT DEFINED BY FIRST POLE TIP

REFERENCE TO RELATED APPLICATION

This is a continuation application of application Ser. No. 09/058,521 filed Apr. 10, 1998, now U.S. Pat. No. 6,130,809.

BACKGROUND OF THE INVENTION

1. Field of the Invention

The present invention relates to a write head before read head constructed merged magnetic head with the track width and the zero throat height of the write head being defined by a first pole tip and more particularly to a magnetic head wherein a first pole tip of a first pole piece is frame plated on a planarized surface so as to accurately define the track width of the write head with high resolution and wherein planarization after constructing the first pole tip reduces separation between read and write gaps of the magnetic head.

2. Description of the Related Art

An inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. This definition is difficult to achieve because the second pole tip is typically formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining layer rises from a plane normal to the ABS at an angle (apex angle) to the plane. After hard baking of the insulation layers and deposition of a metallic seed-layer the sloping surfaces of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography light imaging step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when ultraviolet light strikes the sloping surfaces of the insulation layers in a flaring region of the second pole piece, the ultraviolet light is reflected forward, toward the ABS, into photorresist areas at the sides of the second pole tip region. After development, the side walls of the photoresist extend outwardly from the intended ultraviolet pattern, causing the pole tip plated therein to be poorly formed. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is higher than other regions of the head since the second pole tip is substantially lower on the wafer than the yoke portion of the second pole piece. During the light exposure step the light progressively scatters in the deep photoresist like light in a body of water causing poor resolution during the light exposure step.

A scheme for minimizing the reflective notching and poor resolution problems is to construct the second pole piece with bottom and top second pole tips. The bottom second pole tip is constructed before the insulation layers to eliminate the reflective notching problem. After forming the first pole piece layer and the write gap layer, a photoresist layer is spun on the partially completed head. Ultraviolet light from the photo-patterning step is not reflected forward since the photoresist layer does not cover an insulation stack. Further, the photoresist is significantly thinner in the pole tip region so that significantly less light scattering takes place. After plating the bottom second pole tip the photoresist layer is removed and the first insulation layer, the coil layer and the second and third insulation layers are formed. The top second pole tip is then stitched (connected) to the bottom second pole tip and extends from the ABS to the back gap. Since the bottom second pole tip is well-formed, well-formed notches can be made in the first pole piece, as discussed hereinafter. However, with this head, the ZTH is dependent upon the location of the recessed end of the bottom second pole tip. Since the bottom second pole tip has to be long enough to provide a sufficient stitching area, this length may result in undesirable flux leakage between the first and second pole pieces. Since the top second pole tip is typically wider than the bottom second pole tip, the second pole piece has a T-shape at the ABS. The upright portion of the T is the front edge of the bottom second pole tip, and the cross of the T is the front edge of the top second pole tip. A problem with this configuration is that during operation, flux fringes from the outer corners of the top second pole tip to a much wider first pole piece at the ABS, causing adjacent tracks to be overwritten.

Once the bottom second pole tip is formed, it is desirable to notch the first pole tip of the first pole piece opposite the first and second corners at the base of the bottom second pole tip so that flux transfer between the pole tips does not stray beyond the track width defined by the bottom second pole tip. Notching provides the first pole piece with a track width that substantially matches the track width of the bottom second pole tip. A prior art process for notching the first pole piece entails ion beam milling the gap layer and the first pole piece, employing the bottom second pole tip as a mask. The gap layer is typically alumina and the first and second pole pieces and pole tips are typically Permalloy (NiFe). The alumina mills more slowly than the Permalloy; thus the top of the bottom second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the bottom second pole tip is the first to be milled because of a shadowing effect at the first and second corners caused by the bottom second pole tip when the ion beam is angled. In this case, the ion stream will overmill the first pole piece before the gap layer is removed adjacent the first and second corners of the bottom second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can expose leads to the MR sensor, thereby rendering the head inoperative.

Even if overmilling of the first pole piece can be controlled, there is potentially a more troublesome problem, namely overmilling the top of the bottom second pole tip when the unwanted portions of the gap layer are milled and notches are formed. In order to compensate for this overmilling, the aspect ratio (ratio of thickness of photoresist to track width of the bottom second pole tip) is increased so that a top portion of the top of the bottom second pole tip can be sacrificed during the milling steps. When the aspect ratio is increased, definition of the bottom second pole tip is degraded because of the thickness of the photoresist, discussed hereinabove, resulting in track overwriting.

Another problem with the prior art merged MR head is that the profile of the MR sensor between the first and second gap layers is replicated through the second shield/first pole piece layer to the write gap layer causing the write gap layer to be slightly curved concave toward the MR sensor. When the write head portion of the merged MR head writes data the written data is slightly curved on the written track. When the straight across MR sensor reads this curved data there is progressive signal loss from the center of the data track toward the outer extremities of the data track.

All merged magnetic heads have a separation between the read and write gaps. This separation causes misregistration between the read and write gaps when the magnetic head is located at outer tracks on the magnetic disk. In the magnetic disk drive, an actuator swings the magnetic head across the rotating disk to various circular tracks on the disk. At the innermost track the read and write gaps are substantially aligned with one another and there is substantially no misregistration. At the innermost track the read gap follows within the track written by the write gap. However, when the actuator swings the magnetic head to the outermost track the read and write gaps are misaligned with respect to the track. If the write gap is within the track being written the read gap may be partially in the track and partially in an adjacent track. The misregistration increases with an increase in the separation between the read and write gaps. In magnetic heads where the write head is constructed before the read head the profile of the insulation stack of the write head raises the height of the first shield layer of the read head. It would be desirable if this profile could be reduced so that the read and write gaps are closer together.

Still another problem with prior art magnetic heads is that heating of high magnetic moment pole tips risks damage to the read sensor of the read head. A high magnetic material is $Ni_{45}Fe_{55}$ as compared to $Ni_{80}Fe_{20}$. Pole tips constructed of high magnetic material are desirable because they will conduct higher flux density without saturating. A still further problem with prior art magnetic heads is the risk of shorting of lead layers in the read head through the first read gap layer to the first shield layer. The first and second read gap layers are purposely very thin so as to narrow the read gap and increase linear bit density reading capability. Pinholes are more likely at steps in the first read gap layer than in flat portions of the first read gap layer. It is desirable that the partially completed magnetic head be planarized before the first read gap layer is constructed so as to reduce the chance of pinholes. The lack of planarity can cause still another problem in the construction of one or more coil layers. If there is a step, such as at a side edge of the first pole piece layer, this will cause reflective notching in adjacent portions of a photoresist layer employed to construct the coil layer.

SUMMARY OF THE INVENTION

The advantages of the present invention are as follows: (1) substantially eliminate reflective notching and increase resolution of a photoresist pattern for constructing a pole tip that defines the track width of the head, (2) eliminate write gap curvature, (3) lower the insulation stack so that the read and write gaps are closer together, (4) planarize the construction of the partially completed head at various steps so that frame plating of metallic layers is more accurate, (5) high temperature construction of high magnetic moment pole tips without risking damage to the read sensor, (6) construction of a first read gap layer on a planarized first shield layer so as to minimize shorting of the lead layers to the first shield layer and (7) eliminate reflective notching of a photoresist pattern for constructing a coil layer.

In the present invention the write head of the merged magnetic head is constructed before the read head. In one embodiment a first pole piece layer is formed on a wafer with front and back upstanding components to form a recess between the components in a yoke region of the head. An insulation material, such as alumina, is deposited over the entire wafer. The wafer is then lapped until tops of the front and back components are exposed leaving a bed of flat alumina therebetween, as well as flat alumina portions adjacent side edges of the first pole piece layer. A first coil can then be frame plated on the flat alumina portions with high resolution. The front and back components are then built up higher by frame plating followed by deposition of alumina and lapping to planarize the construction. A second coil may then be formed on the planar alumina surface.

A highly defined front component, which comprises the first pole tip, may then be frame plated on the flat alumina layer with substantially no reflective notching along with a back component which comprises a back gap. Alumina may then be deposited and lapped until top surfaces of the pole tip and the back gap are exposed. After deposition of a gap layer a flat second pole piece/first shield layer is frame plated followed by deposition of another alumina layer and lapping until the partially completed head is planar. Then a first read gap layer, read sensor first and second lead layers and a second read gap layer are formed. The front components, other than the first pole tip, can be at or recessed from the ABS. Further, the first pole tip may be constructed before the second coil layer or on a flat alumina layer after forming the second coil layer.

With the present invention the insulation stack can be recessed with respect to the write gap so that the profile of the insulation stack does not contribute to the separation between the read and write gaps. Since the read head is constructed after the write head, high temperatures can be employed in the construction of a high magnetic moment first pole tip without damaging the read sensor. Since the partially completed head is planarized before construction of a coil layer a more highly defined coil layer can be constructed. Another embodiment of the invention is a single coil magnetic head constructed similarly to that described for the double coil magnetic head.

An object of the present invention is to substantially eliminate reflective notching and increase resolution of a photoresist pattern for constructing a pole tip that defines the track width of a write head before read head constructed merged magnetic head.

Another object is to eliminate write gap curvature.

A further object is to lower an insulation stack so that the read and write gaps are closer together.

Yet another object is to planarize the construction of a partially completed magnetic head at various steps so that frame plating of metallic layers is more accurate.

Still another object is to employ high temperature construction of high magnetic moment pole tips without risking damage to a read sensor.

Still a further object is to construct a first read gap layer without steps so as to minimize shorting of first and second lead layers to a first shield layer.

Still another object is to eliminate reflective notching of a photoresist pattern for constructing a coil layer.

Other objects and attendant advantages of the invention will become apparent upon reading the following description taken together with the accompanying drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 16 is an isometric illustration of an embodiment of the present invention which has a double coil and a single first pole tip (pole tip design) at an air bearing surface;

FIG. 17 is an isometric illustration of the first pole piece and first pole tip of the pole tip design shown in FIG. 16;

FIG. 22 is an isometric illustration of another embodiment of the magnetic head employing a double coil and top and bottom first pole tips which is referred to as a lip design;

FIG. 23 is an isometric illustration of the first pole piece of the embodiment shown in FIG. 22 showing a bottom first pole tip which looks like a lip and a top first pole tip which is a pedestal;

FIG. 29AA is the same as FIG. 29Y except a second pole piece/first shield layer has been frame plated;

FIG. 29AB is an ABS view taken along plane 29AB—29AB of FIG. 29AA;

FIG. 29AC is the same as FIG. 29AA except a layer of alumina has been deposited on the wafer;

FIG. 29AD is a view taken along plane 29AD—29AD of FIG. 29AC;

FIG. 29AE is the same as FIG. 29AC except the wafer has been lapped until all surfaces are flush with respect to one another;

FIG. 29AF is a view taken along plane 29AF—29AF of FIG. 29AE;

FIG. 29AG is the same as FIG. 29AE except a first read gap, a read sensor, first and second lead layers, a second read gap and a second shield layer have been formed; and FIG. 29AH is an ABS view taken along plane 29AH—29AH of FIG. 29AG.

DESCRIPTION OF THE PREFERRED EMBODIMENTS

Magnetic Disk Drive

Figure 4:
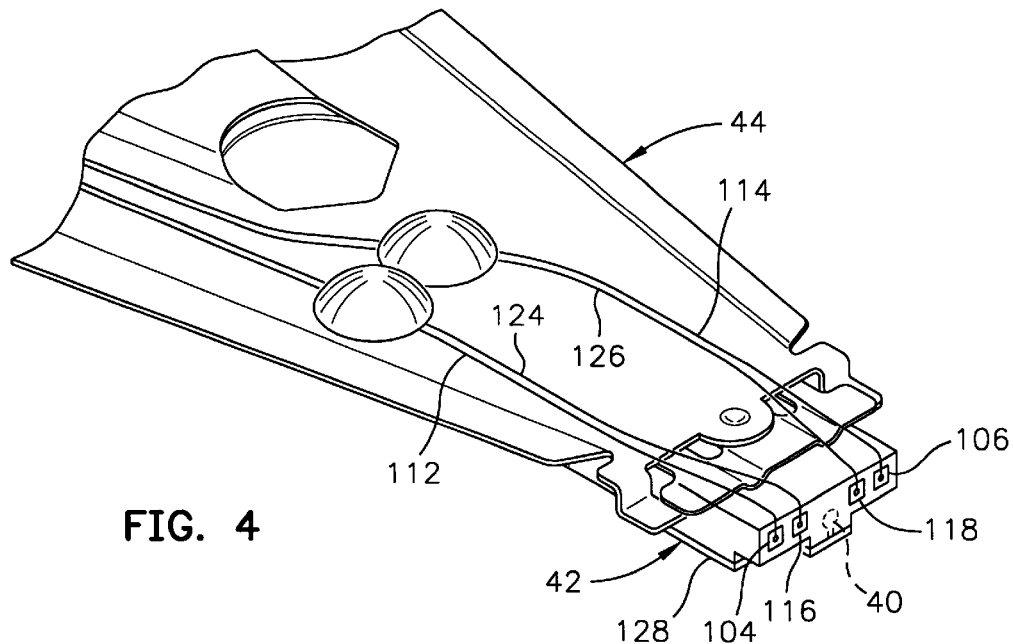
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 2 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) a s shown in FIG. 3. The suspension 44 and actuator arm 46 position the slider 42 so that the magnetic head 4 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
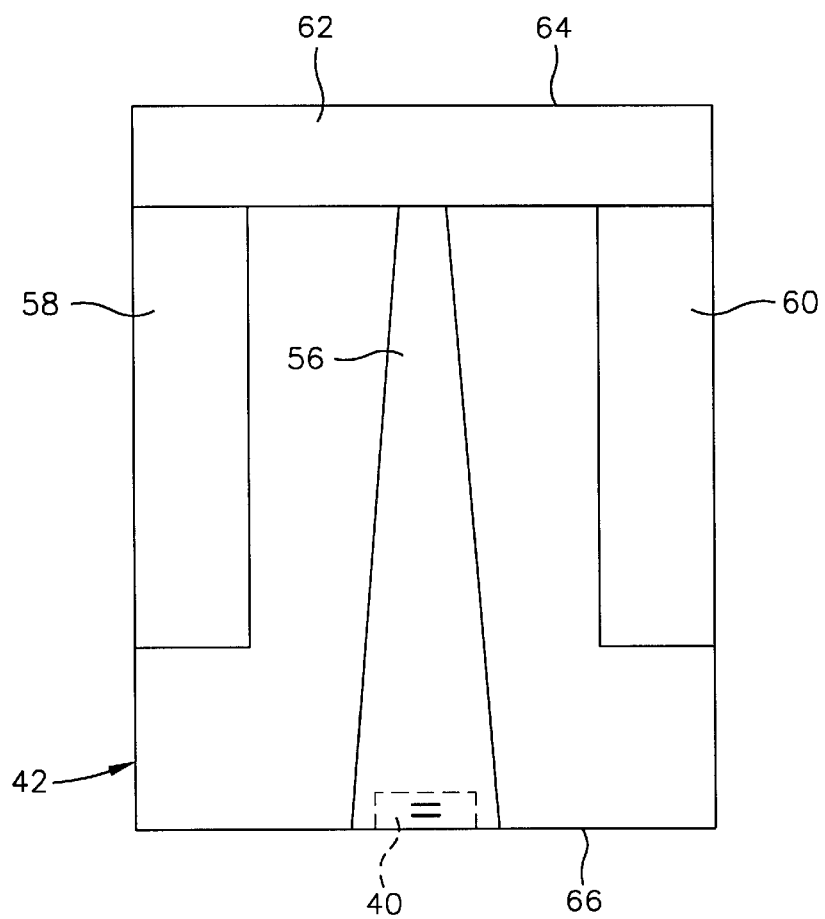
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

Figure 6:
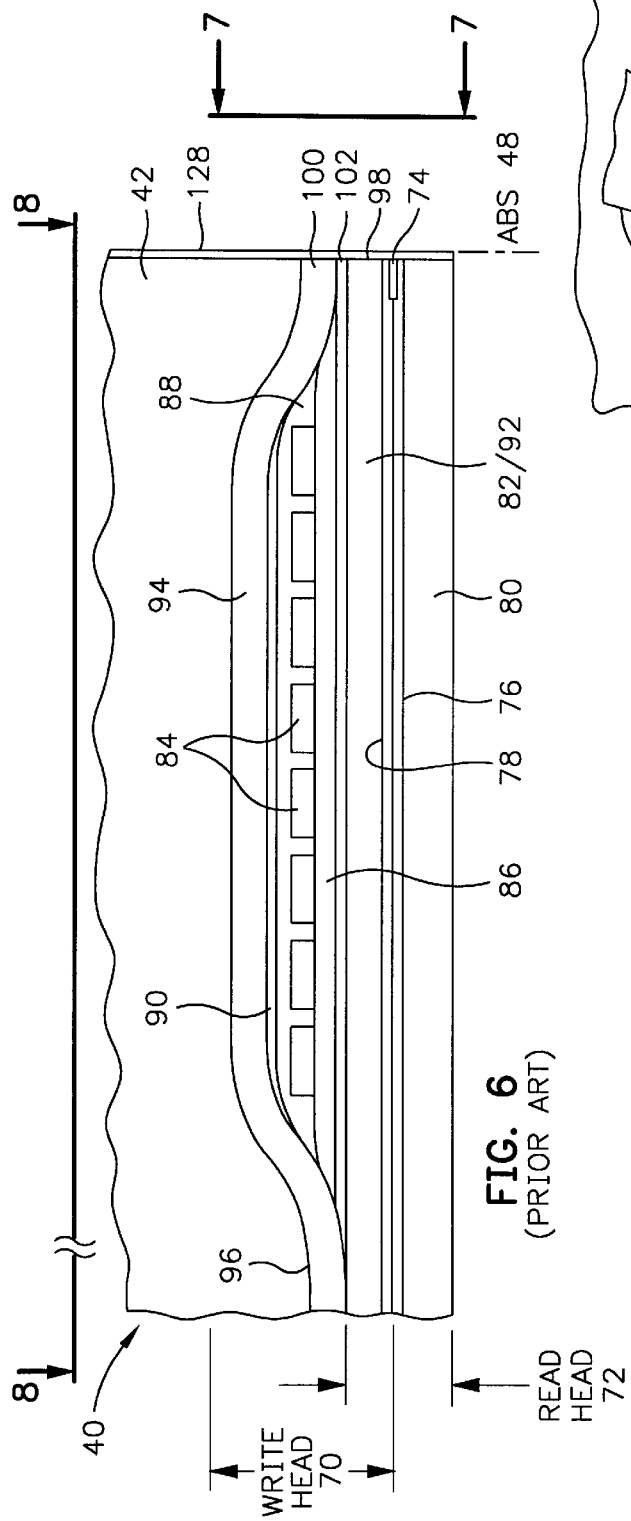
FIG. 6 is a partial view of the slider and a prior art magnetic head as seen in plane 6—6 of FIG. 2.
Figure 7:
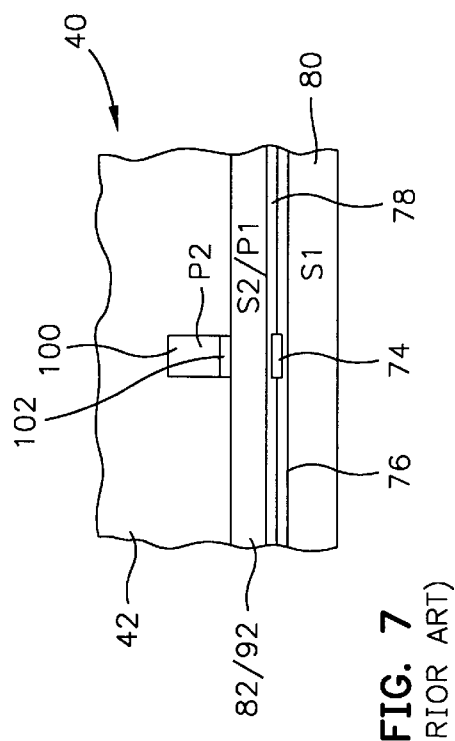
FIG. 7 is a partial ABS view of the slider taken along plane 7—7 of FIG. 6 to show the read and write elements of the prior art magnetic head.

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

Figure 8:
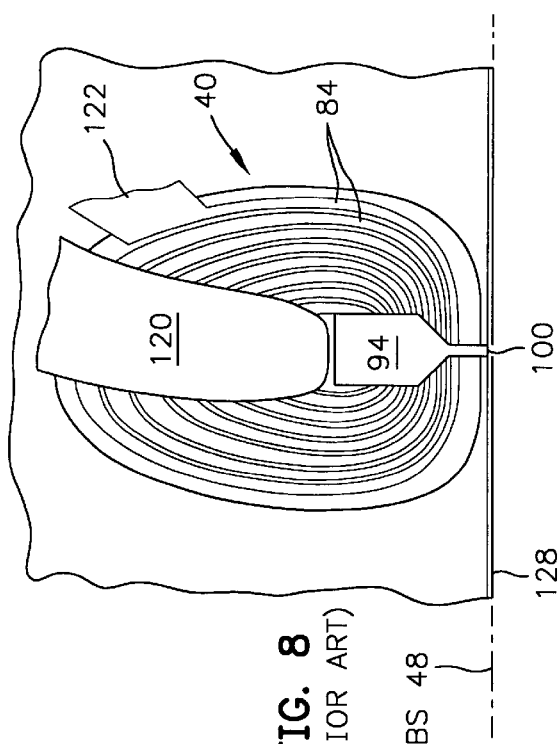
FIG. 8 is a view taken along plane 8—8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 40 employs a single layer 82/92 to serve a double function as a second shield layer for the read head and as a first pole piece for the write head. A piggyback MR head employs two separate layers for these functions.

Figure 9:
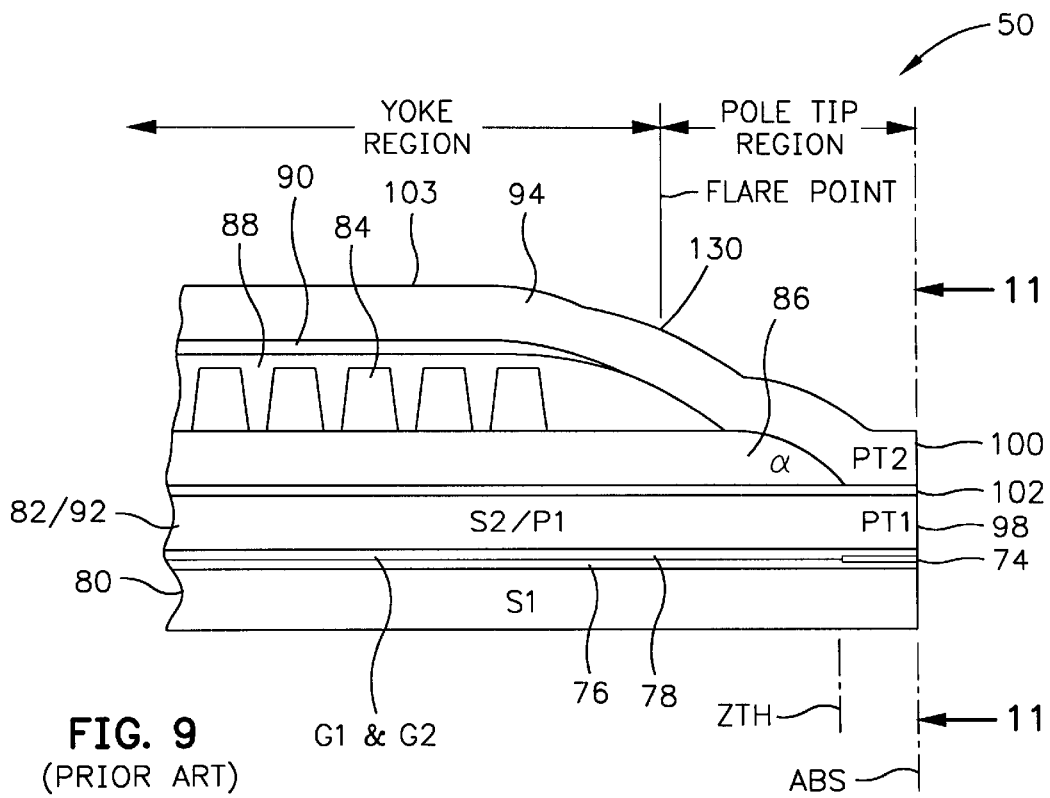
FIG. 9 is an enlarged front portion of the prior art magnetic head of FIG. 6 to show various details thereof.
Figure 12:
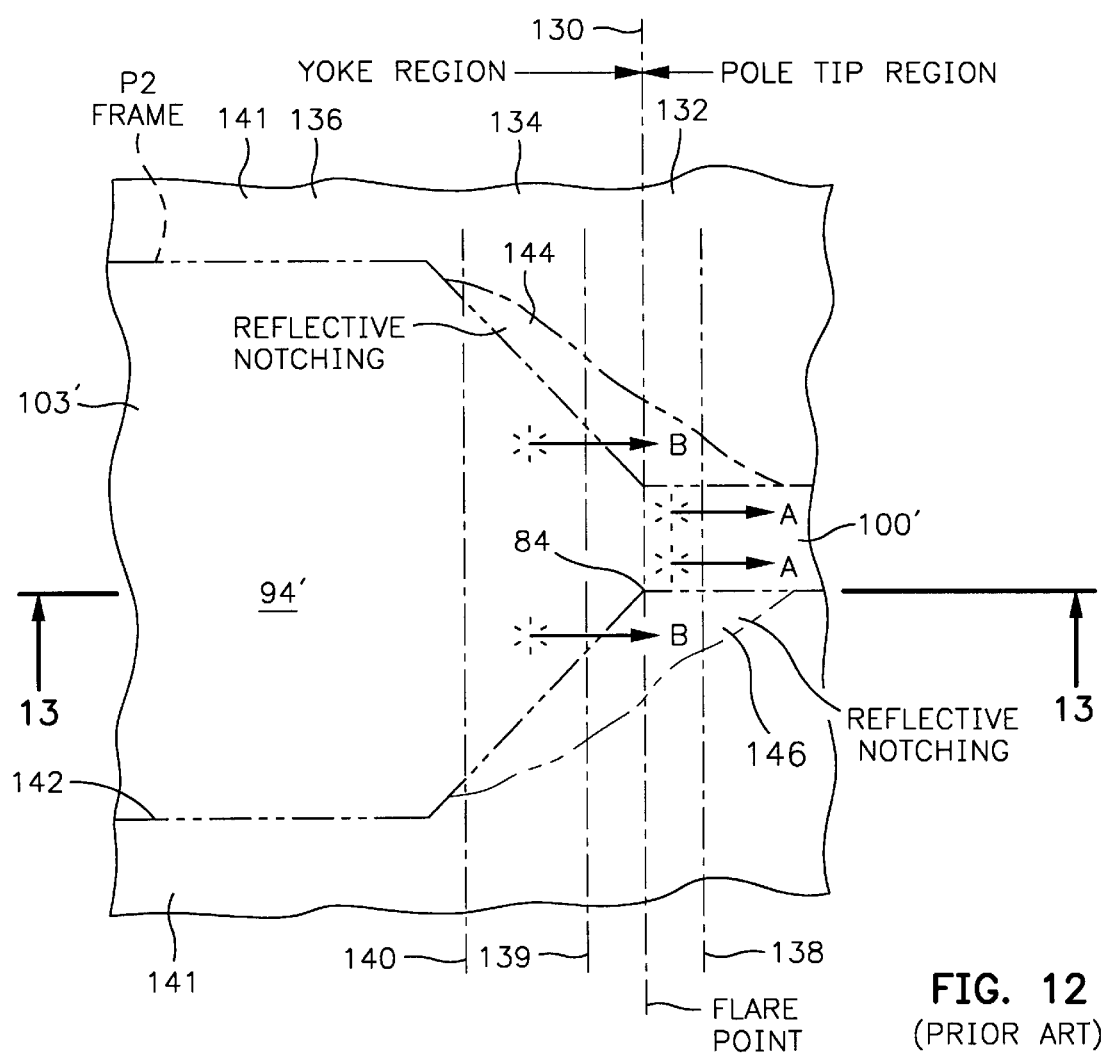
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
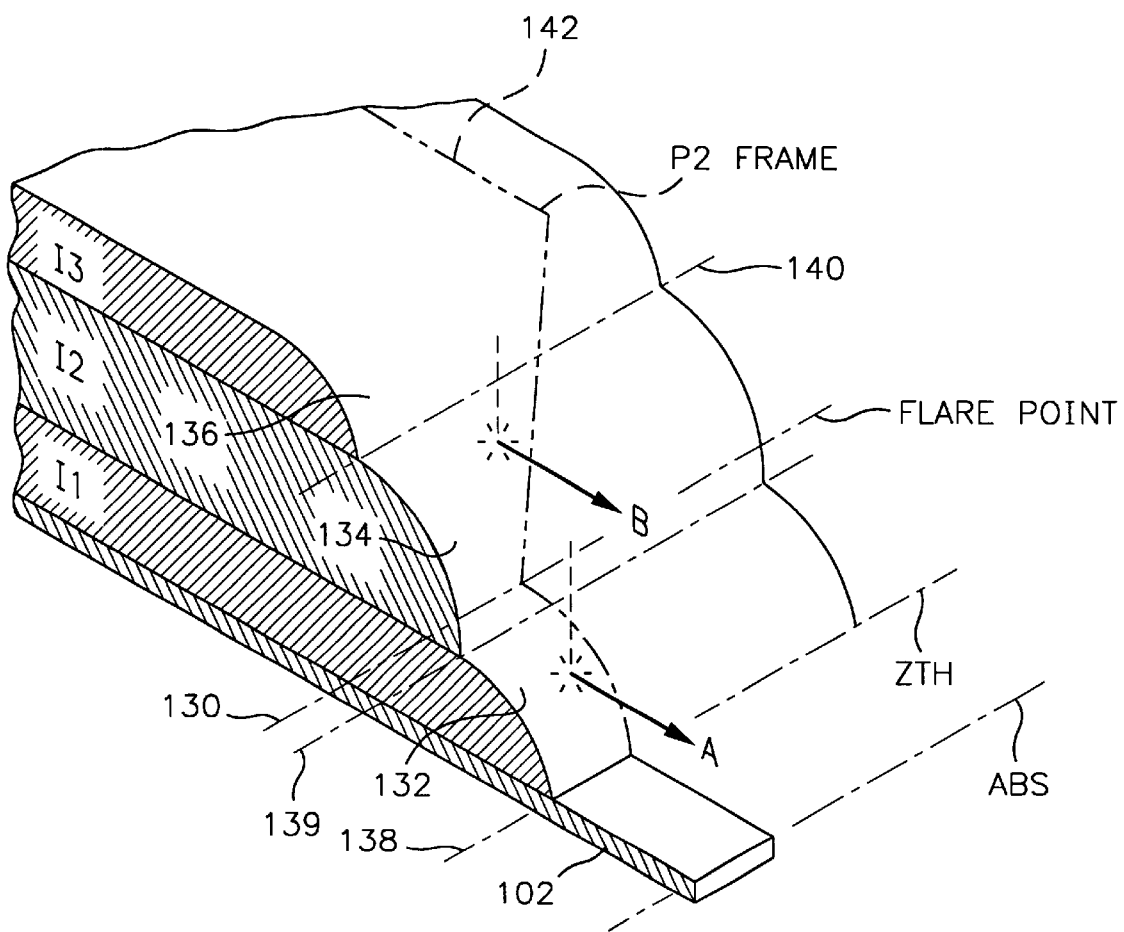
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 μm because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 μm) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
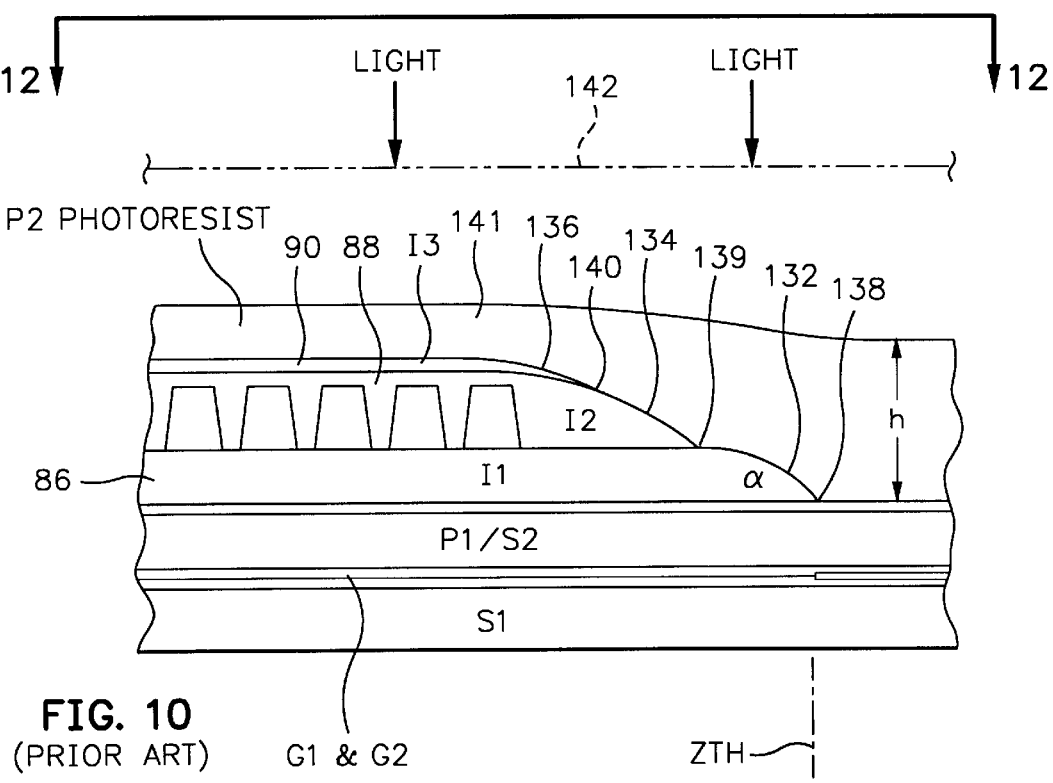
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 μm thick in the pole tip region and is typically approximately 4.5 μm thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
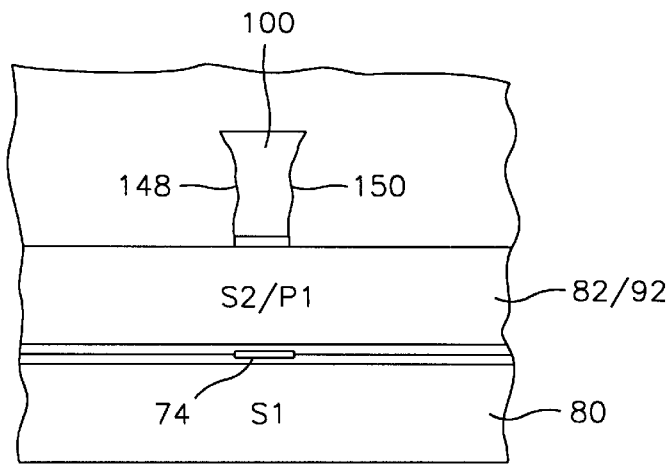
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

Figure 14:
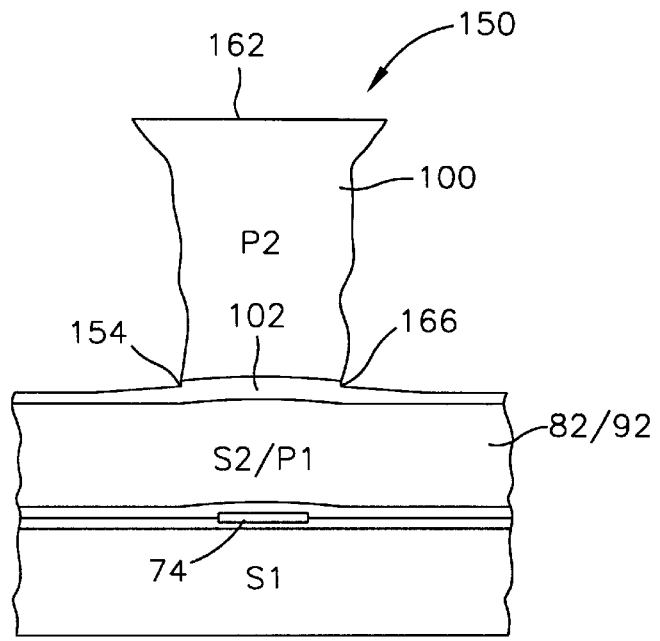
FIG. 14 is an ABS view of a prior art merged MR head before notching of the first pole piece.
Figure 15:
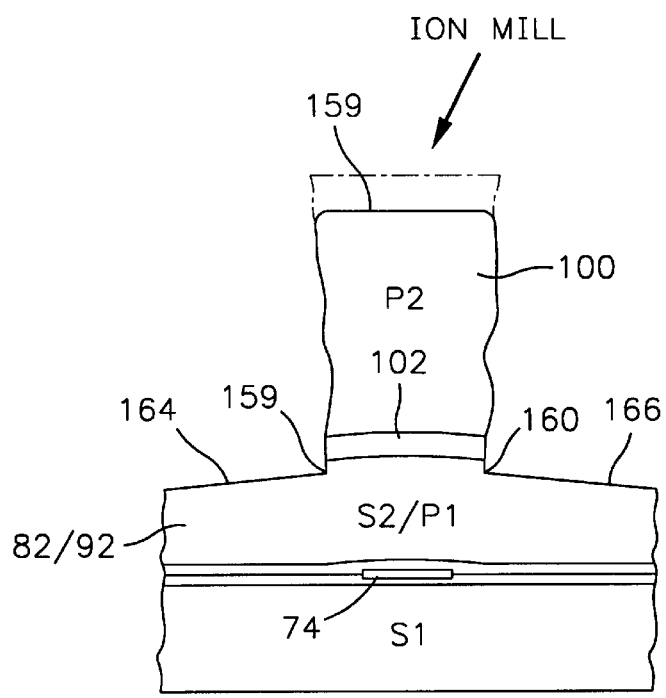
FIG. 15 is an ABS view of the merged MR head shown in FIG. 14 after ion milling to form the first pole piece with notches adjacent the second pole tip.

FIG. 14 is an ABS view of a prior art merged magnetic head 150 after a P2 seedlayer (not shown) has been removed by ion milling. It can be seen that the ion milling has slightly notched the gap layer 102 at 154 and 156. One method of notching the first pole piece layer 82/92 in the prior art is to ion mill through the gap layer into the first pole piece layer as shown in FIG. 15. This notches the first pole piece layer at 159 and 160. Notching of the first pole piece layer 82/92 is desirable since it minimizes side writing between the second pole tip 100 and the first pole piece 82/92. Unfortunately, the process shown in FIG. 15 results in consumption of a top surface 159 of the second pole tip 100, as shown by the phantom lines in FIG. 15. Since ion milling is typically performed at an angle to a normal to the thin film layers, as shown in FIG. 15, the second pole tip 158 shadows the milling of the notching at 159 and 160 approximately 50% of the time while the workpiece is rotated. Consequently, the first pole piece 82/92 is overmilled in locations 164 and 166 which extend in the field remote from the notches 159 and 160 respectively. This causes the first pole piece 82/92 to have downwardly sloping top surfaces 164 and 166, as shown in FIG. 15, which undesirably reduces the thickness of the first pole piece 82/92 in the field. This can potentially expose sensitive elements beneath the first pole piece 82/92 rendering the head inoperative. The gap layer 102 mills more slowly than the Permalloy (NiFe) of the first and second pole pieces which results in more rapid ion milling of the top 159 of the second pole tip 100 and the fields 164 and 166 of the first pole piece 82/92 than the gap layer 102.

It can be seen from FIG. 15 that the beginning thickness of the second pole tip layer 100 has to be thicker than the final height of the second pole tip layer at 159 in order to compensate for the top portion of the second pole tip layer consumed by ion milling. This then requires the photoresist mask to be thicker which increases the aforementioned problem of additional light scattering during the light photoimaging step as the photoresist layer increases in depth. This means that the second pole tip cannot be constructed as narrow because of loss of definition during the photoresist patterning. FIG. 15 also shows the write gap 102 slightly curved due to the profile of the MR sensor being replicated through the second shield first pole tip layer 82/92 to the gap layer 102. Accordingly, it can now be seen that the prior art merged MR head suffers from the disadvantages of reflective notching of the second pole tip, loss of a top portion of the second pole tip upon notching the first pole piece and write gap curvature. These problems are overcome by the inverted merged MR head described hereinbelow.

Another problem with the prior art head in FIGS. 14 and 15 is that the write gap 102 has a curvature due to replication of the profile of the MR sensor by the second gap layer 78 and the second shield/first pole piece layer 82/92. As discussed hereinabove, this causes information to be written in a curve across a track which is inaccurately read by the straight MR sensor 74.

The Invention

Figure 18:
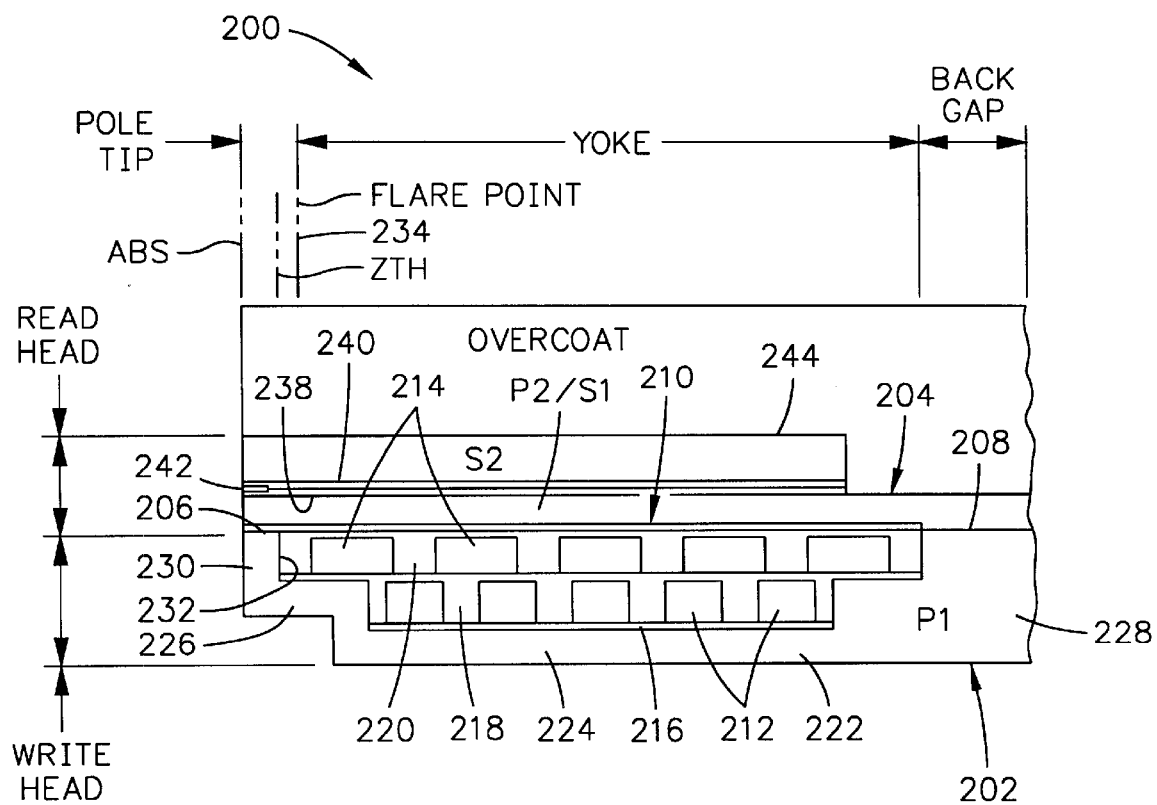
FIG. 18 is a longitudinal cross-section through the pole tip design employing a double coil.

FIGS. 16 and 18 show a first embodiment 200 of the present invention wherein a read head portion of a merged magnetic head is constructed on top of a write head portion. The write head includes first and second pole pieces 202 and 204 (P1 and P2), respectively, which are separated by a gap layer 206 at the ABS to form a write gap therebetween and are connected at a back gap 208. An insulation stack 210 is located vertically between the first and second pole pieces and horizontally between the air bearing surface (ABS) and the back gap 208. First and second coil layers 212 and 214 may be embedded in the insulation stack with the first coil 212 being separated from the first pole piece 202 by a first insulation layer 216, the first and second coil layers being separated from one another by a second insulation layer 218 and the second coil layer 214 being insulated from the second pole piece 204 by a third insulation layer 220. During construction of the write head portion, the top surfaces of each of these insulation layers are planarized with respect to top surfaces of front and rear components of the first pole piece, which will be discussed in more detail hereinafter under the method of construction.

Figure 20:
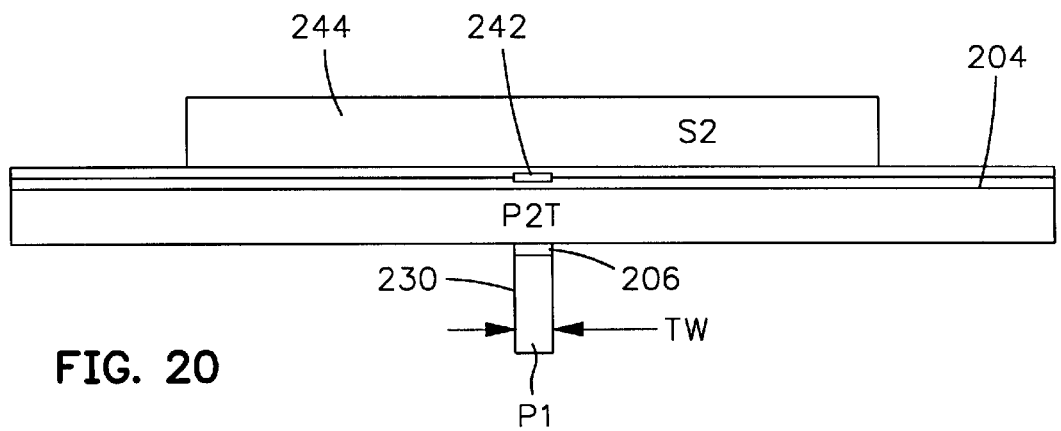
FIG. 20 is a schematic ABS illustration of an embodiment of the pole tip design.
Figure 21:
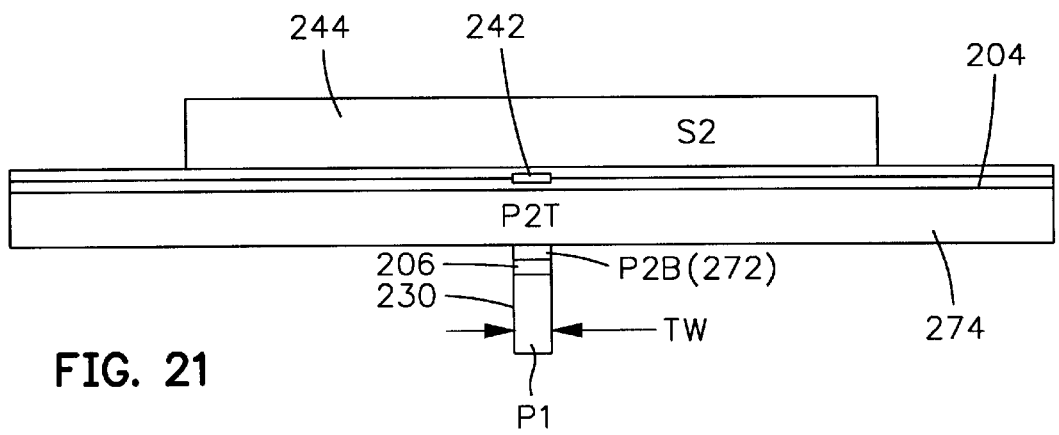
FIG. 21 is a schematic ABS illustration of another embodiment of the pole tip design.

The first pole piece includes a first pole piece layer 222 which has an intermediate component 224 between front and rear components 226 and 228. Each of these components has top and bottom surfaces which are substantially flat and define a planar surface. A first pole tip 230 is located on the front component of the first pole piece layer and has a width at the ABS which defines the track width (TW) of the write head, as shown in FIGS. 20 and 21. The first pole tip also has a back wall 232 that defines a zero throat height (ZTH) of the write head where the first and second pole pieces first commence to separate from one another after the ABS. The flare point of the head, which is where the first pole piece layer 222 first commences to widen after the ABS, is shown at 234. The pole tip region of the head is defined between the ABS and the flare point. As shown in FIG. 18, the write head portion has a yoke region which is located between the pole tip region and the back gap region. The first pole tip 230 is the only pole tip of the first pole piece and is connected to the front component 226. Accordingly, the head shown in FIGS. 16–21 is referred to as a pole tip design since there is no bottom first pole tip. This is clearly shown in FIG. 17 where only the front portion of the bottom pole piece 202 is illustrated. The first pole tip 230 has a substantially uniform width from its top to its bottom which defines the track width of the head. The first pole tip can be easily constructed by frame plating on a planar surface, which will be discussed in more detail hereinafter, and has a back wall 232 that defines the zero throat height with great accuracy. The frame plating of the first pole tip on a planar surface also eliminates reflective notching and promotes high resolution of the side walls of the first pole tip. The first pole tip 230 can be a high moment magnetic material, such as $Ni_{45}Fe_{55}$, since it is constructed separately from the remainder of the first pole piece 202. This high moment material can be annealed at a high temperature without damage of a read sensor, which is to be described hereinafter. Since the insulation layers of the insulation stack 208 are planarized at each step, the coil layers 212 and 214 can be frame plated without reflective notching with high resolution of their side walls.

After planarizing the top insulation layer 220 with the top of the first pole tip 230 the write gap layer 206 is deposited, which extends from the ABS to the back gap 208. Accordingly, a second pole piece/first shield layer 204 (P2/S1) can be a substantially flat layer. This enables the following layers, namely the first and second read gap layers 238 and 240, a read sensor 242 and first and second lead layers 244 and 245 located between the first and second read gap layers and a second shield layer 246 (S2) to be planar. This is especially important for the first read gap layer 238 since steps in the second pole piece/first shield layer 204 risk pinholes in the first read gap layer, which allow the first and second lead layers 244 and 245 to short to the second pole piece/first shield layer 204.

The preferred material for the insulation layers of the insulation stack 210 and the extensions of these layers beyond side edges of the first pole piece layer 202 is alumina or silicon dioxide in lieu of baked photoresist. The extensions of these layers beyond the side edges 247 and 248 of the first pole piece layer 202, which are shown hereinafter in the method of making, provide flat surfaces for the construction of the first and second coil layers 212 and 214. The construction of the first insulation layer 216 (see FIG. 18) fills in the steps caused by the first and second side edges 247 and 248 of the first pole piece layer 202 so as to promote planarization.

Figure 19:
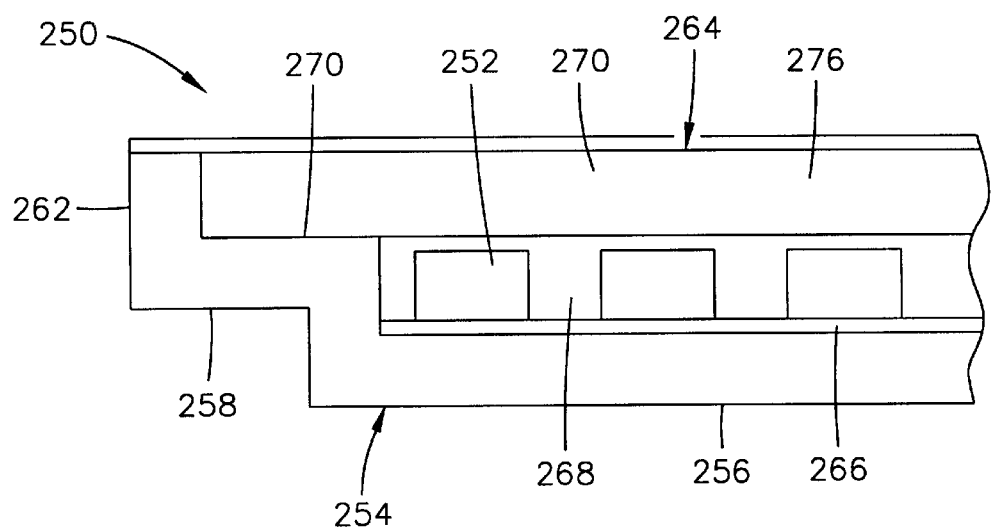
FIG. 19 is a longitudinal cross-sectional view of another embodiment of the pole tip design employing a single coil.

Another embodiment 250 of the pole tip design is shown in FIG. 19 which employs a single coil layer 252 in lieu of a double coil layer. As in the double coil layer embodiment, the first pole piece 254 includes an intermediate component 256 between front and rear components, the front component being shown at 258. The front component 258 extends to the ABS and the first pole tip 262 is constructed thereon. The front component 258 and the first pole tip 262 have the same width which defines the track width (TW) of the head. The insulation stack 264 has first, second and third insulation layers 266, 268 and 270 with the coil layer 252 on the first insulation layer 266. The second insulation layer 268 is planarized with the top surface 270 of the front component so that the first pole tip 262 can be constructed with a photoresist frame on a flat surface.

FIG. 20 is an ABS illustration of either of the embodiments shown in FIGS. 18 or 19. FIG. 21 is an alternative embodiment wherein the second pole piece 204 has a bottom second pole tip 272 (P2B) and a top second pole tip 274 (P2T). The bottom second pole tip 272 has substantially the same width as the first pole tip 230 and is separated therefrom by the write gap layer 206. This embodiment is referred to in the art as being notched since the bottom second pole tip 272 is the same width as the first pole tip 230. The purpose of the notched configuration is to slightly increase side writing between the pole pieces which has the effect of writing a guard band of noise on each side of the written track so that when the track is read by the read head a slight misregistration will not cause the read head to read data on an adjacent track. In the construction of the embodiment shown in FIG. 21, the bottom second pole tip 272 can be frame plated after electroplating the write gap of NiP or Pd or Ir followed by the deposition of alumina and lapping to make a planar surface for the construction of the top second pole tip.

Figure 24:
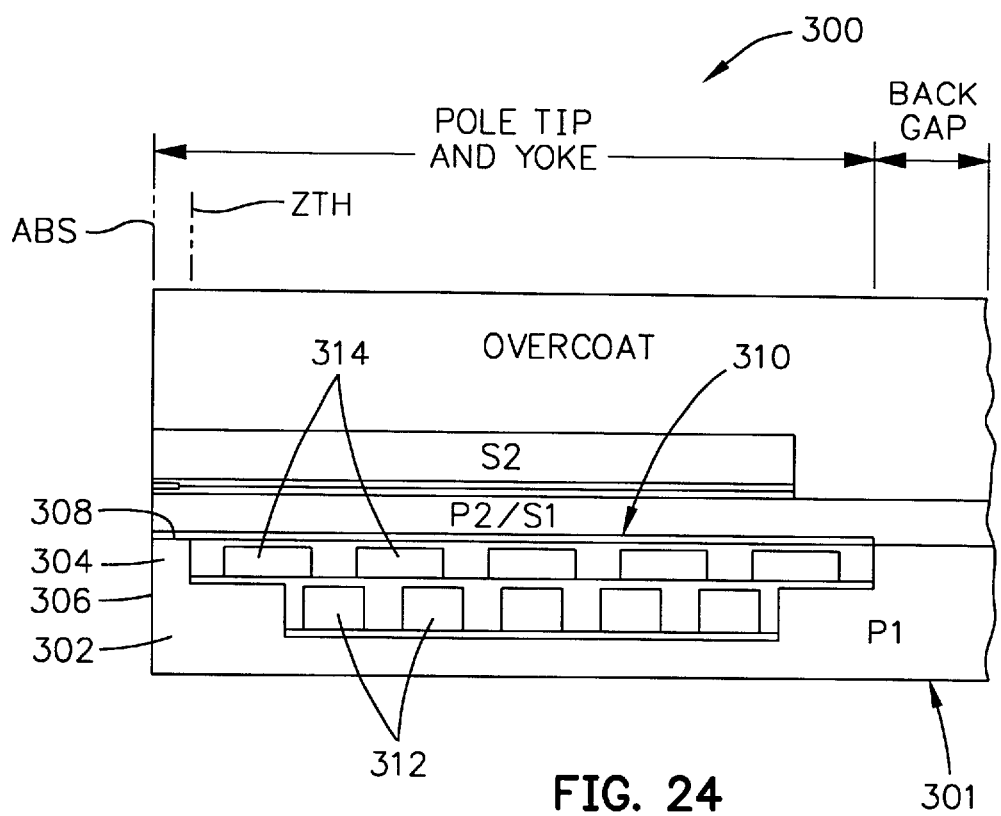
FIG. 24 is a longitudinal cross-sectional view through the embodiment shown in FIG. 22.
Figure 25:
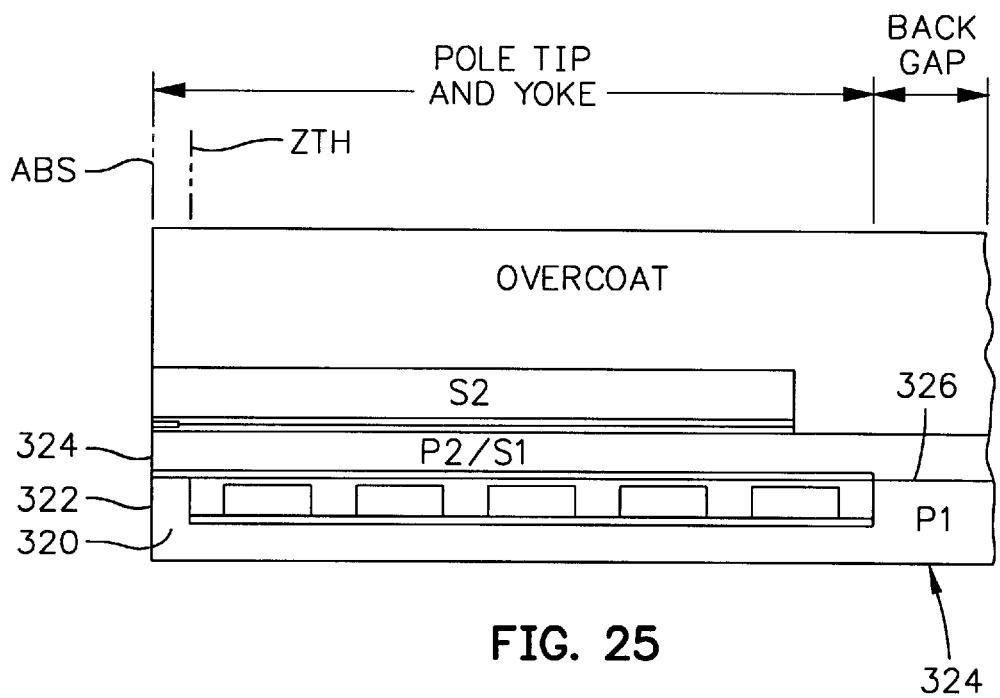
FIG. 25 is a longitudinal cross-sectional view through another embodiment of the lip design showing a single coil layer.
Figure 26:
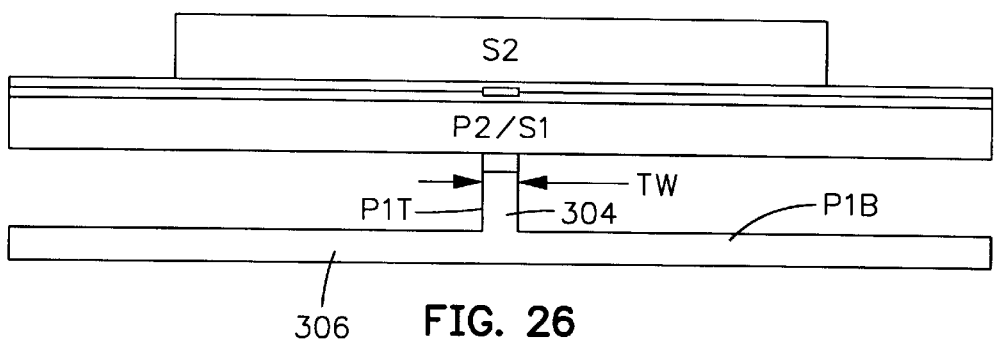
FIG. 26 is an ABS illustration of one embodiment of the lip design.
Figure 27:
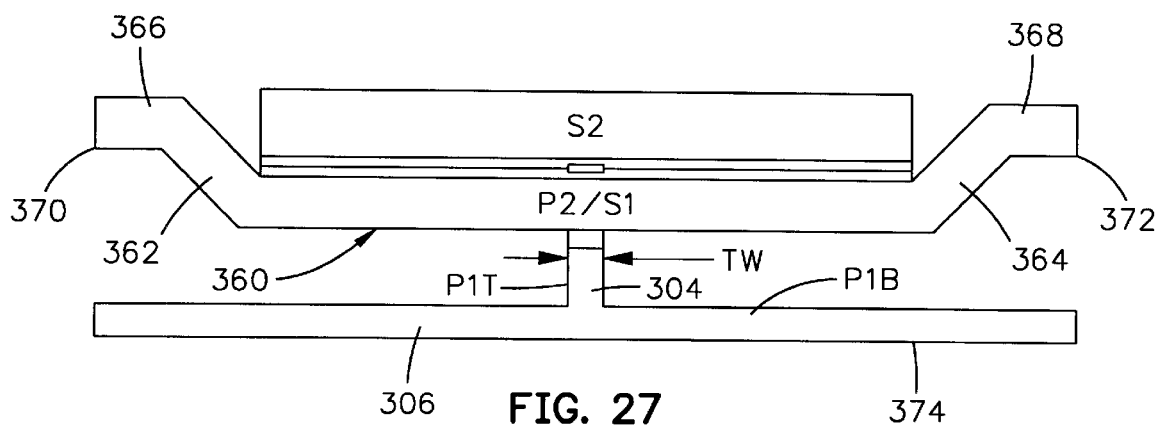
FIG. 27 is an ABS illustration of another embodiment of the lip design.
Figure 28:
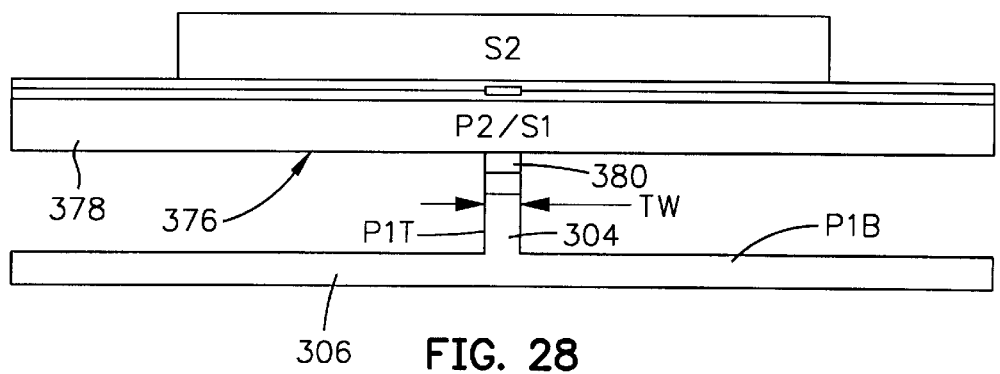
FIG. 28 is an ABS illustration of a further embodiment of the lip design.

Another embodiment 300 of the merged magnetic head is shown in FIGS. 22–28. This embodiment differs from the first embodiment in that the front component 302 of the first pole piece 301 has a width at the ABS that is wider than the first pole tip 304. Accordingly, the front component 302 forms a bottom first pole tip 306 (P1B) and the pole tip thereon is a top first pole tip 304 (P1T). The top first pole tip 304 defines the track width (TW) of the head, as shown in FIGS. 26–28. Except for the front component 302 defining a bottom first pole tip 306, the double coil head shown in FIGS. 22 and 24 is the same as the first embodiment shown in FIGS. 16 and 18. FIG. 23 shows more clearly the front portion 302 of the first pole piece 301 wherein the wide expanse of the bottom first pole tip 306 at the ABS appears as a lip. Accordingly, the embodiment 300 is referred to hereinafter as the lip design. The top first pole tip 304 is constructed directly on the top surface of the bottom first pole tip 306 after the top surface 308 of the bottom first pole tip 306 is planarized with the top surface of the second insulation layer 312. The single coil lip design, shown in FIG. 25, is the same as the single coil pole tip design shown in FIG. 19, except the front component 320 of the first pole piece forms a bottom first pole tip 322 which is wider than the top first pole tip 324. It should be noted that the lip design in FIGS. 92, 24 and 25 does not have a flare point since the bottom first pole tip 322 is the same width as the first pole piece 324 from the ABS to the back cap 326. As shown in FIG. 22, insulation of the insulation stack 310 extends beyond side edges 347 and 348 of the first pole piece to planarize the wafer for construction of the coil layers 312 and 314.

FIGS. 26–28 illustrate various configurations for the lip design at the ABS. The illustration in FIG. 26 is representative of the air bearing surfaces of the heads shown in FIGS. 22, 24 and 25. FIG. 27 is a modification of the illustration shown in FIG. 26 in that the second pole piece layer 360 has first and second upwardly inclined portions 362 and 364 which are connected to elevated first and second flat portions 366 and 368. The purpose of this construction is to further separate the bottom outside corners 370 and 372 of the second pole piece layer from the wide expanse of the bottom first pole tip 374. Since high flux densities are concentrated in these corners, this extra distance minimizes flux leakage between the second pole piece layer 360 and the bottom first pole tip 374. In FIG. 28, the second pole piece 376 is provided with top and bottom second pole tips 378 and 380 in a notched configuration so as to promote a slight amount of side writing, as explained hereinabove with regard to FIG. 21.

Method of Construction

Figure 29A:
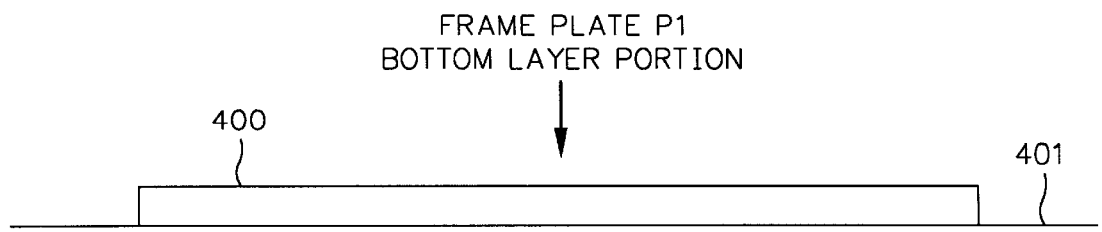
FIG. 29A is a longitudinal cross-sectional view of a first step of plating a bottom layer portion of a first pole piece on a wafer.
Figure 29B:
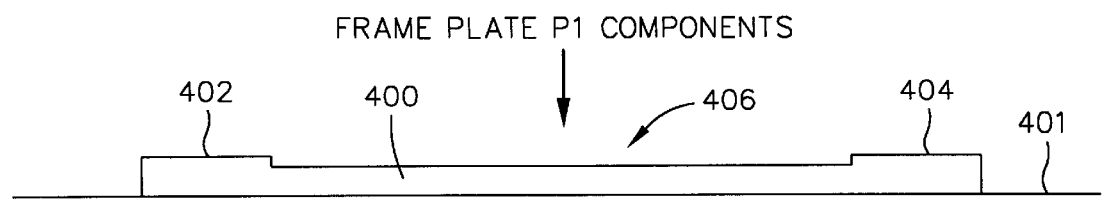
FIG. 29B is the same as FIG. 29A except front and back components of the first pole piece have been formed.
Figure 29C:
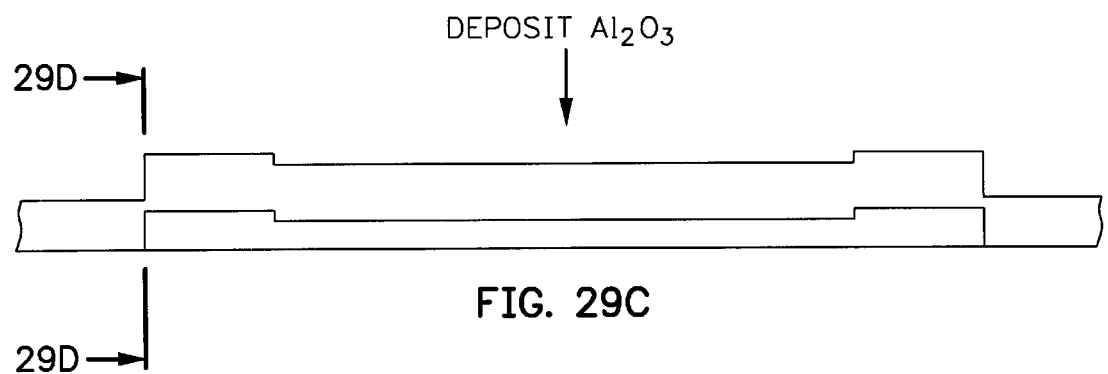
FIG. 29C is the same as FIG. 29B except alumina is deposited on the wafer.
Figure 29D:
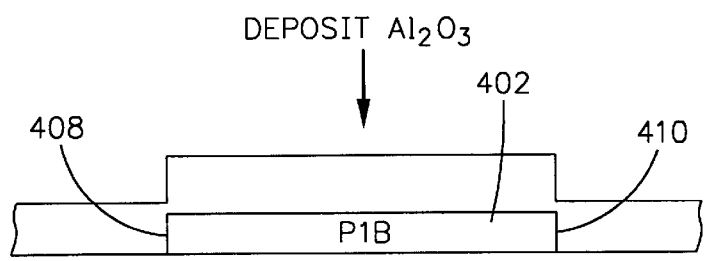
FIG. 29D is an ABS illustration taken along plane 29D—29D of FIG. 29C.
Figure 29E:
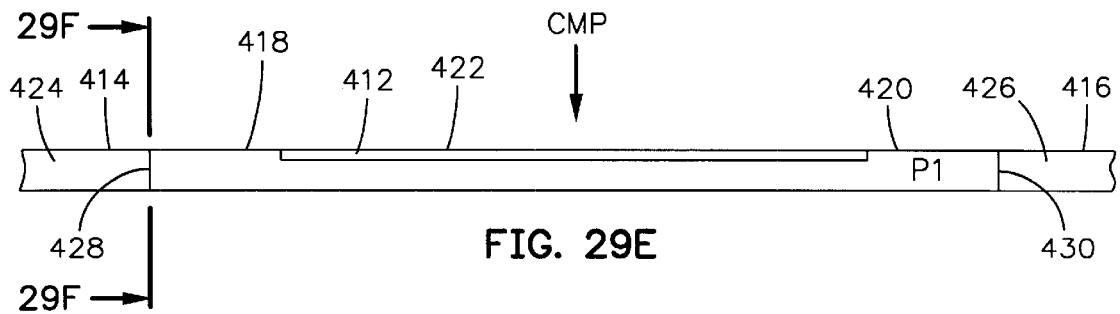
FIG. 29E is the same as FIG. 29C except the wafer has been lapped so that all surfaces are flush with respect to one another.
Figure 29F:
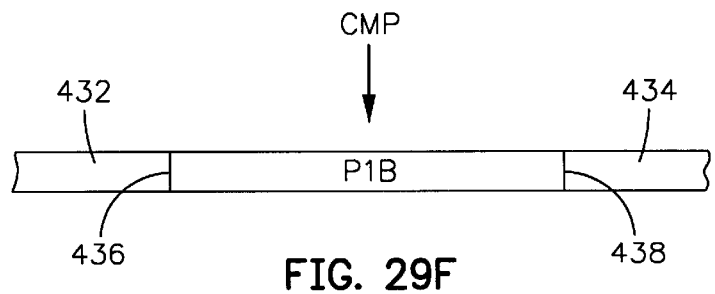
FIG. 29F is an ABS view taken along plane 29F—29F of FIG. 29E.

An exemplary method of construction of the merged magnetic head 300, shown in FIGS. 22 and 24, is shown in FIGS. 29A–29AH. In FIG. 29A a bottom flat layer portion 400 of a first pole piece is frame plated on a wafer 401. In FIG., 29B a first front component 402 and a first rear component 404 are frame plated on the layer 400 in a spaced relationship so as to define a recess 406 therebetween. In FIG. 29C alumina is sputter deposited over the entire wafer covering all components of the first portion of the first pole piece layer. FIG. 29D is an ABS illustration of FIG. 29C showing how the alumina fills in the steps at first and second side edges 408 and 410 of the first front component 402. In FIG. 29E the wafer is chemically mechanically polished (CMP), which causes top surfaces 412, 414 and 416 of the alumina layer and top surfaces 418 and 420 of the first front component and the first rear component to be flush with respect to one another. This provides a first insulation layer 422 within the recess and insulation layers 424 and 426 in the field beyond front and rear edges 428 and 430 of the bottom layer portion of the first pole piece layer. FIG. 29F is an ABS view of FIG. 29E showing the alumina to have first and second layers 432 and 434 adjacent first and second side edges 436 and 438 of the bottom portion of the first pole piece so as to planarize the wafer in the field beyond the partially completed magnetic head.

Figure 29G:
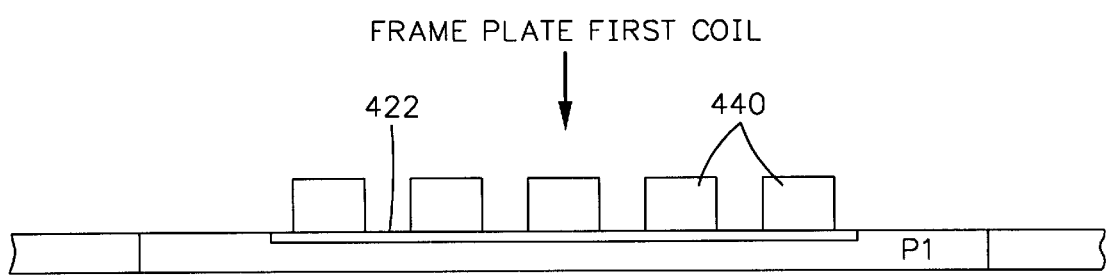
FIG. 29G is the same as FIG. 29E except a first coil layer has been frame plated on the wafer.
Figure 29H:
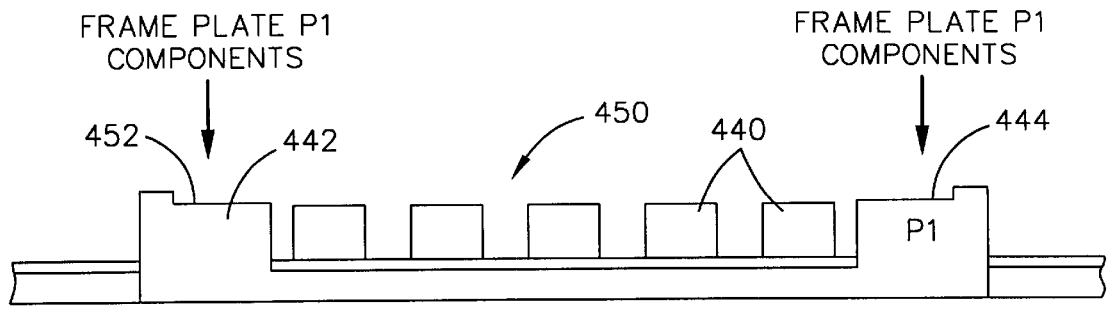
FIG. 29H is the same as FIG. 29G except front and back components of the first pole piece have been frame plated.
Figure 29I:
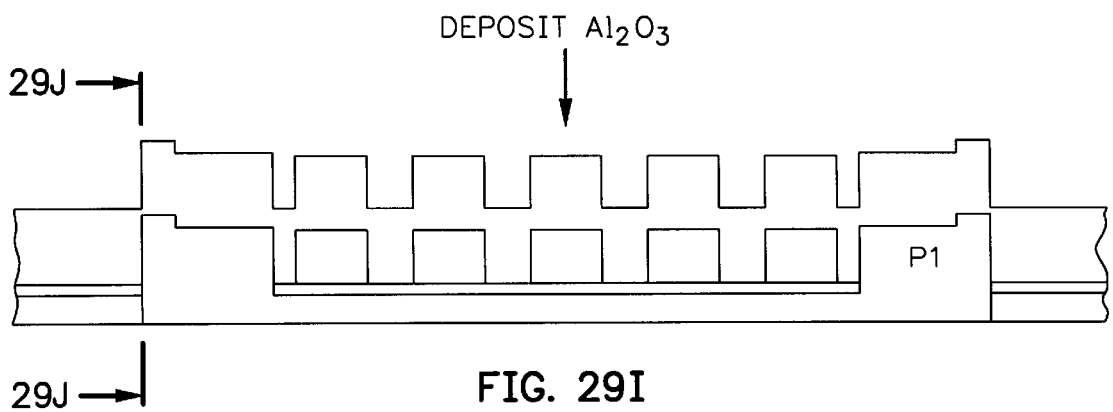
FIG. 29I is the same as FIG. 29H except alumina has been deposited on the wafer.
Figure 29J:
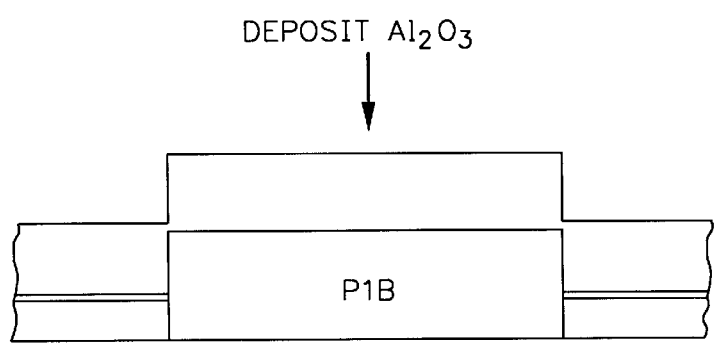
FIG. 29J is an ABS illustration taken along plane 29J—29J of FIG. 29I.
Figure 29K:
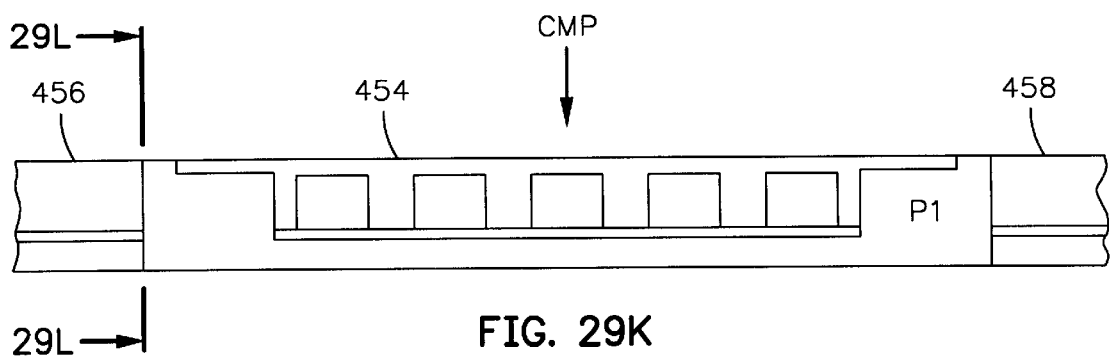
FIG. 29K is the same as FIG. 29I except the wafer has been lapped until all surfaces are flush with respect to one another.
Figure 29L:
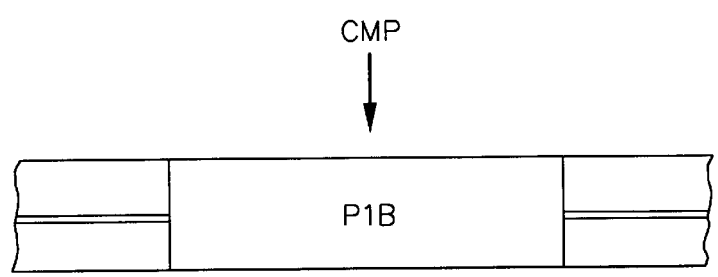
FIG. 29L is an ABS view taken along plane 29L—29L of FIG. 29K.

In FIG. 29G a first coil layer 440 is frame plated on the first insulation layer employing a photoresist frame (not shown), which is planarized across the wafer. In FIG. 29H a second front component 442 and a second rear component 444 are frame plated on the first front component and the first rear component, respectively, thereby raising the front and back ends of the partially completed first pole piece to form a second recess 450 above the first coil layer 440. The second front component may have a step 452 for facilitating placement of a second coil, which will be described hereinafter. If desired, the order of the steps in FIGS. 29G and 29H can be reversed which will be discussed in more detail hereinafter. In FIG. 29I alumina is deposited over the entire wafer covering the entire partially completed head. FIG. 29J is an ABS illustration of the partially completed head shown in FIG. 29I. In FIG. 29K the wafer is CMP causing the deposited alumina to form a second insulation layer 454 in an intermediate region of the partially completed head and layer portions 456 and 458 forward and rearward of the head to planarize the entire wafer. FIG. 29L is an ABS illustration of FIG. 29K.

Figure 29M:
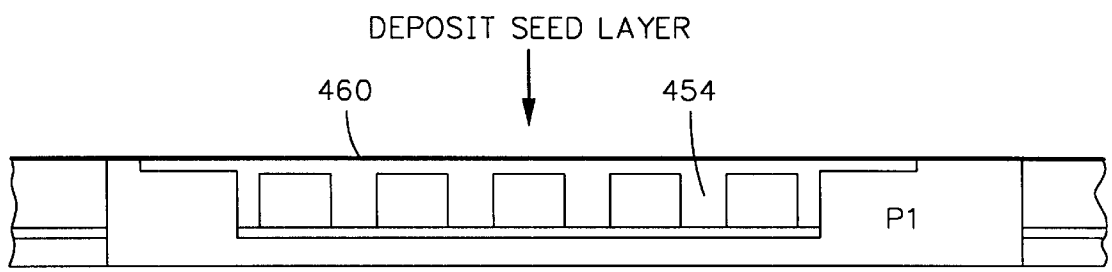
FIG. 29M is the same as 29K except a seedlayer has been deposited.
Figure 29N:
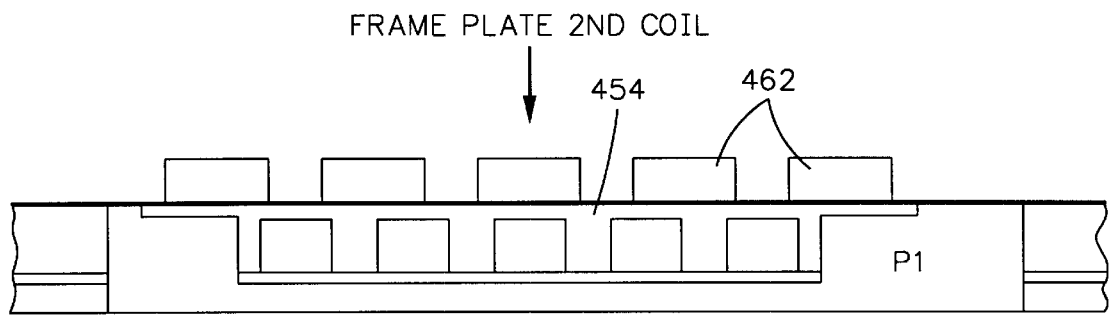
FIG. 29N is the same as FIG. 29M except a second coil layer has been frame plated.
Figure 29:
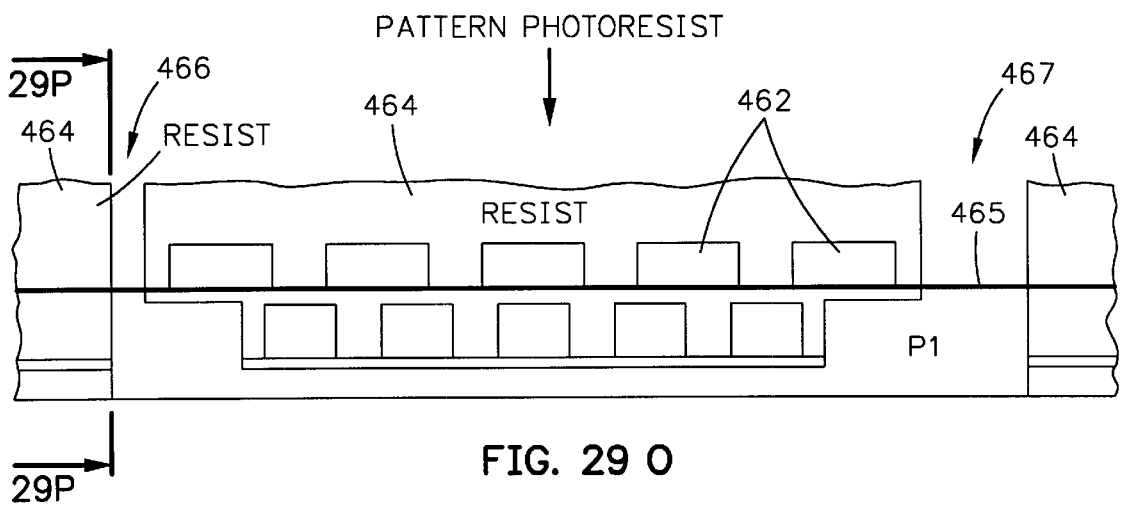
FIG. 29O is the same as FIG. 29N except a photoresist pattern has been formed.
FIG. 29P is a view taken along plane 29P—29P of FIG. 29O.
FIG. 29Q is the same as FIG. 29O except a first pole tip and a back gap portion have been frame plated.
FIG. 29R is a view taken along plane 29R—29R of FIG. 29Q.
FIG. 29S is the same as FIG. 29Q except the photoresist pattern has been removed.
FIG. 29T is an ABS view taken along plane 29T—29T of FIG. 29S.
FIG. 29U is the same as FIG. 29S except an alumina layer has been deposited.
FIG. 29V is an ABS view taken along plane 29V—29V of FIG. 29U.
FIG. 29W is the same as FIG. 29U except the wafer has been lapped until all surfaces are flush with respect to one another.
FIG. 29X is a view taken along plane 29X—29X of FIG. 29W.
FIG. 29Y is the same as FIG. 29W except a write gap layer has been deposited.
FIG. 29Z is an ABS view taken along plane 29Z—29Z of FIG. 29Y.
Figure 29P:
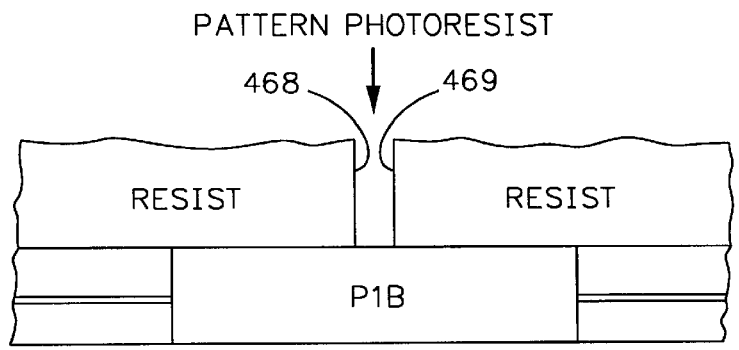
Figure 29Q:
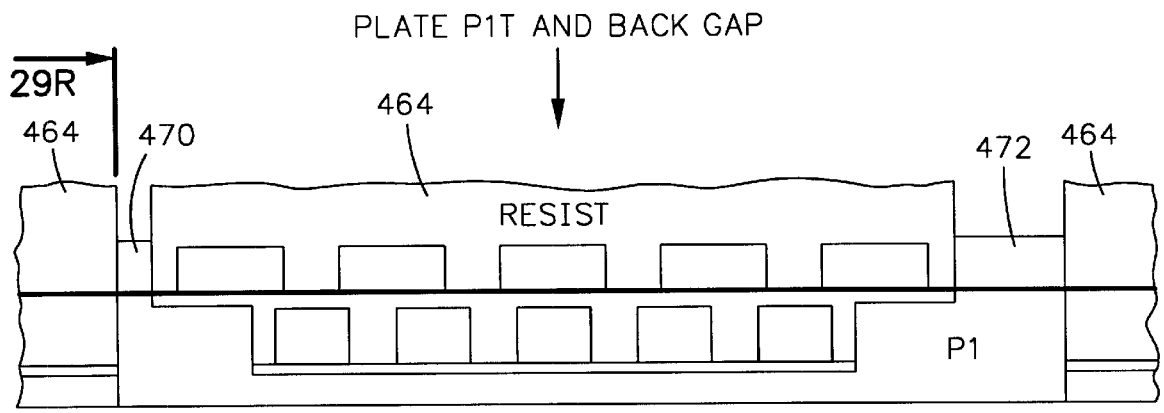
Figure 29R:
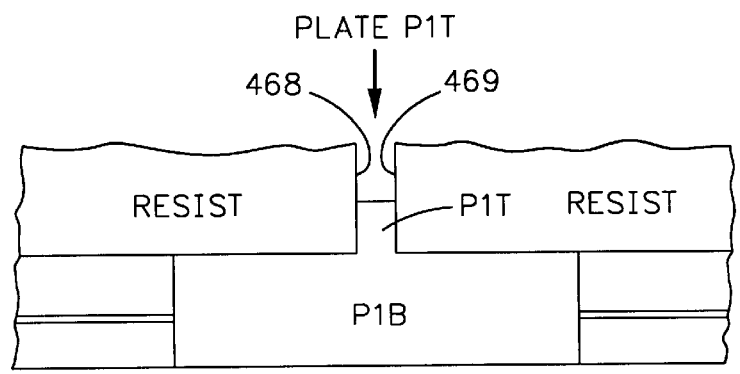
Figure 29V:
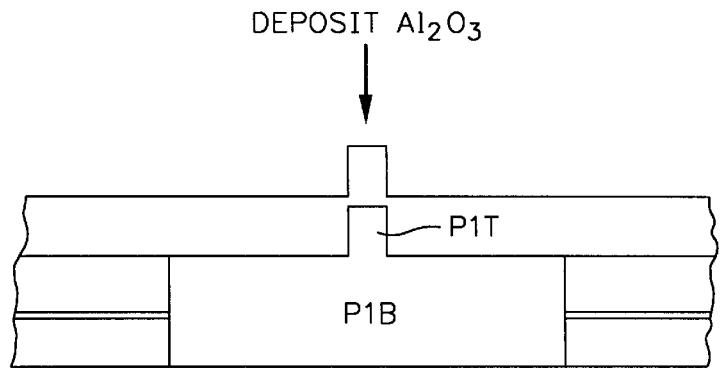
Figure 29W:
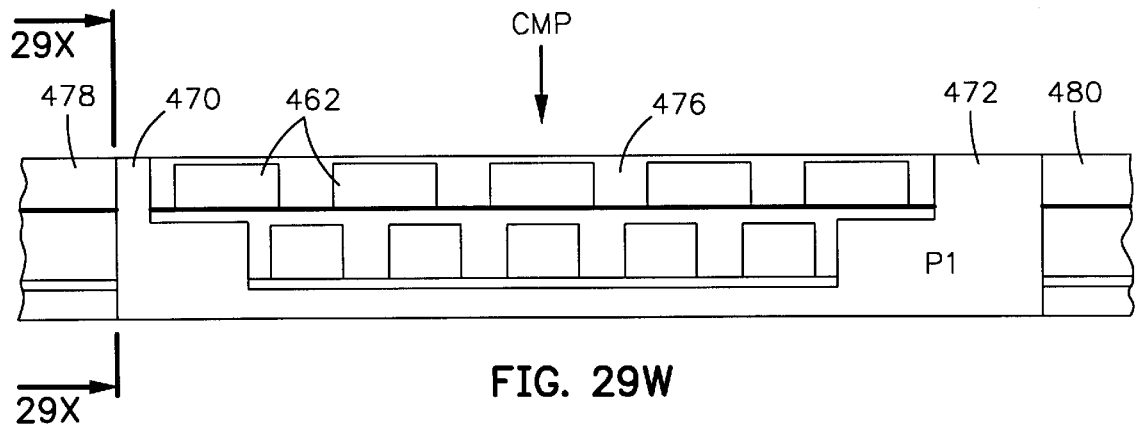
Figure 29X:
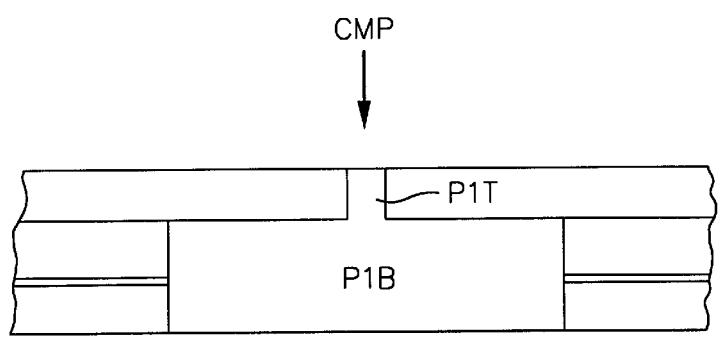
Figure 29Y:
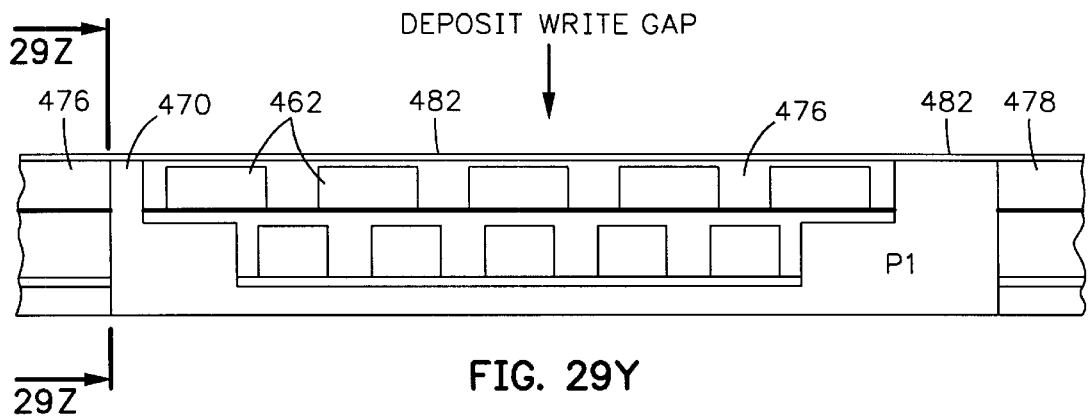
Figure 29Z:
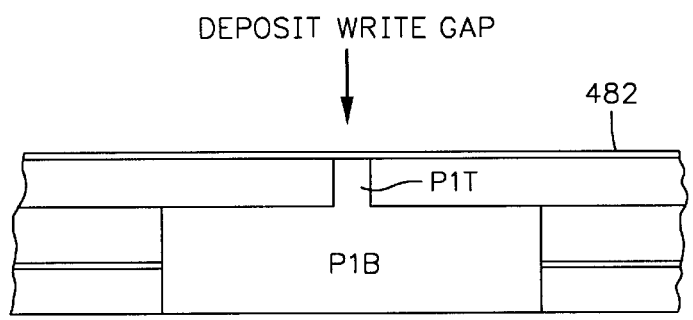
Figure 29A:
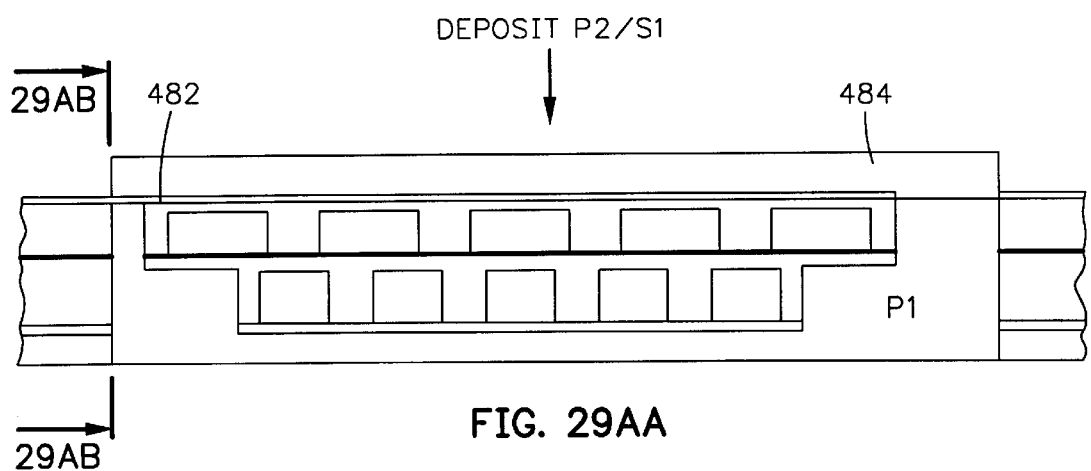
Figure 29A:
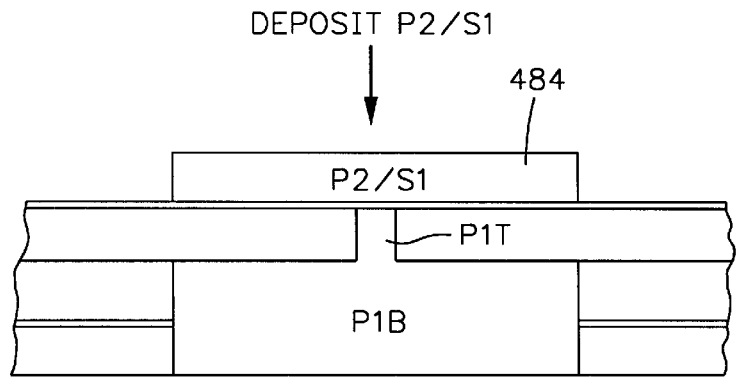
Figure 29A:
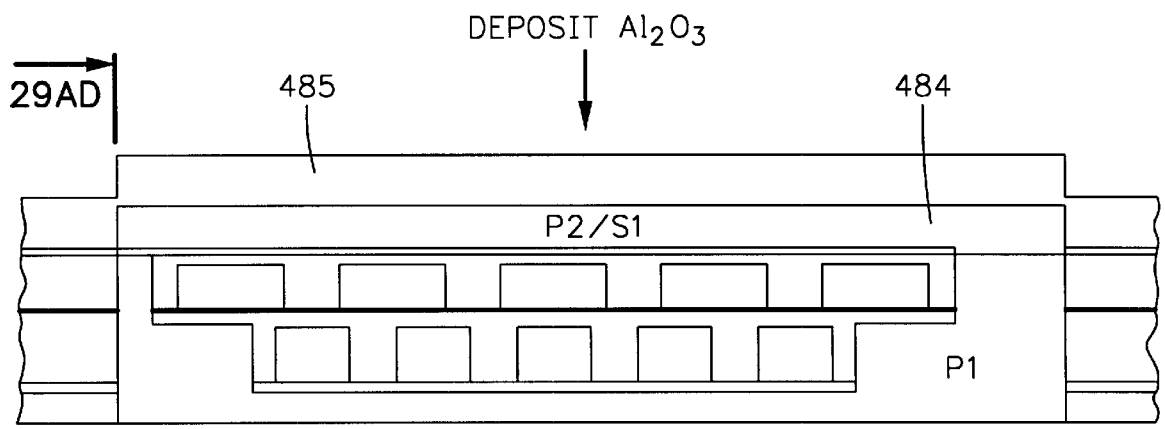
Figure 29A:
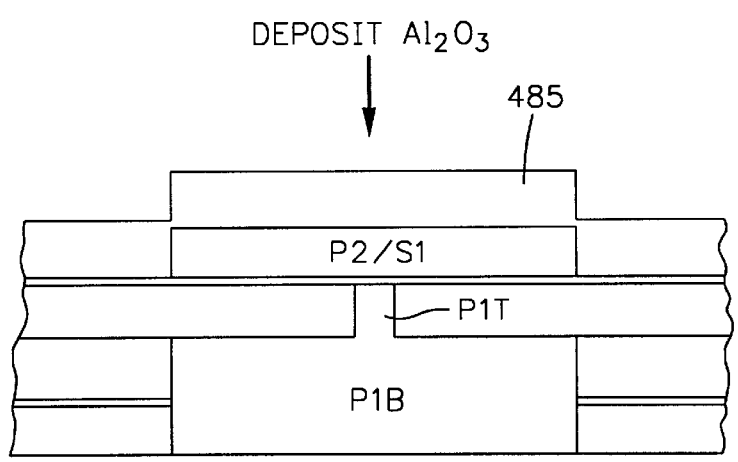
Figure 29A:
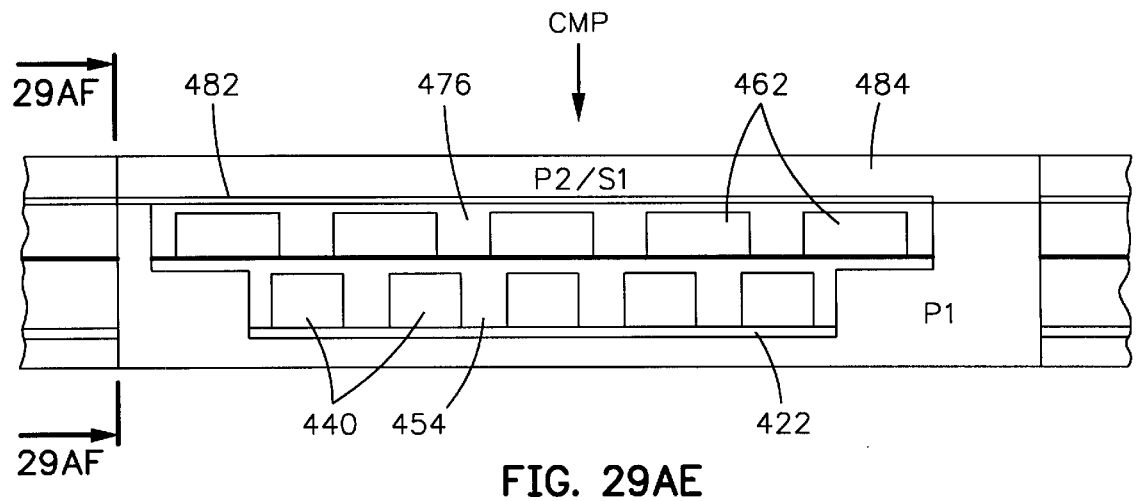
Figure 29A:
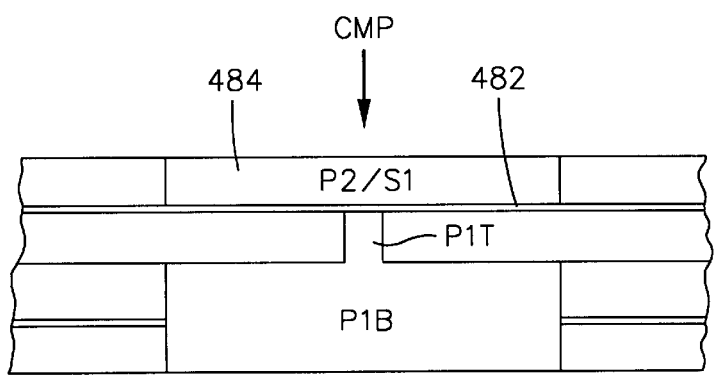
Figure 29A:
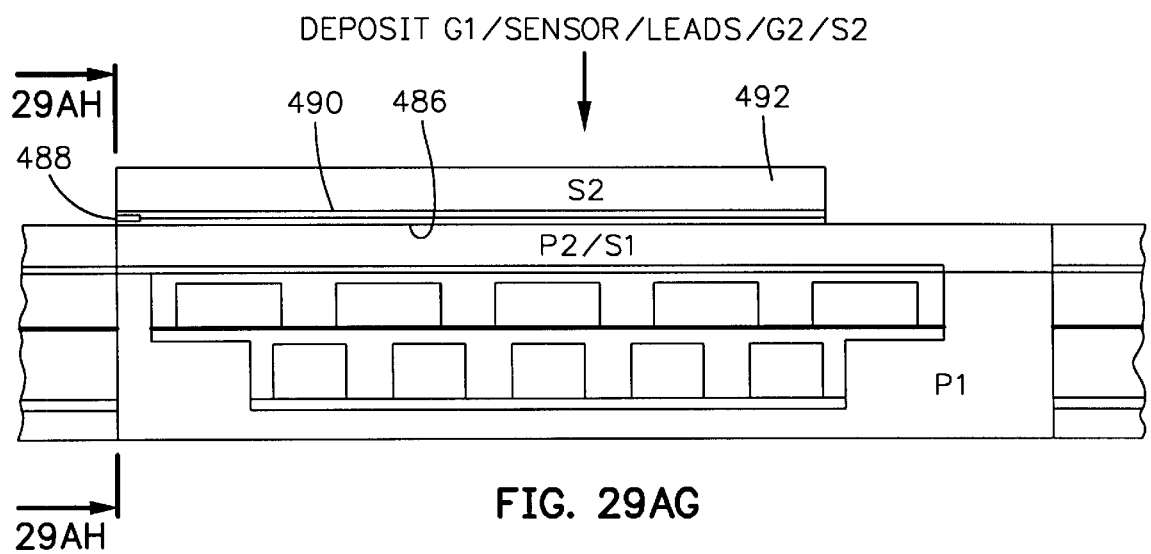
Figure 29A:
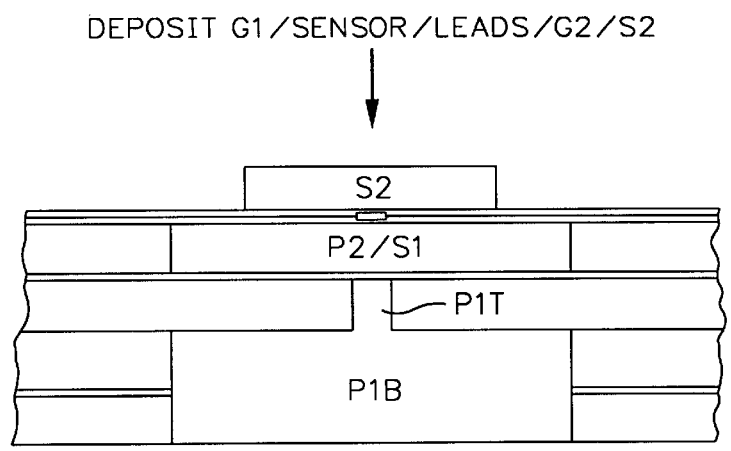

In FIG. 29M a seedlayer 460 is sputter deposited over the entire wafer in preparation for electroplating a second coil. In FIG. 29N a second coil layer 462 has been frame plated on the second insulation layer 454. In FIG. 29O a photoresist layer 464 has been spun on the wafer and photo-patterned to provide openings 466 and 467 for constructing the top first pole tip and a back gap portion of the first pole piece layer. The seedlayer 460 for the coil layer 462 is removed and a seedlayer 465 is deposited for constructing the top first pole tip. The photoresist layer 464 can be significantly thinner since it does not have to accommodate the profile of an insulation stack. The thinner resist allows more efficient penetration of light during the light exposure step so as to promote high resolution of the side walls 468 and 469 of the opening in the resist and the side walls of the top first pole tip which is to be plated therein, as shown in FIG. 29P. In FIG. 29Q the top first pole tip 470 and the back gap portion 472 are plated through openings in the photoresist layer. FIG. 29R is an ABS illustration of FIG. 29Q. In FIG. 29S the photoresist is removed and any remaining seedlayer is also removed by ion milling. FIG. 29T is an ABS illustration of FIG. 29S. Constructing the top first pole tip by the above-described photoresist patterning scheme results in a superior first pole tip 470 which can be submicron with high In FIG. 29U an alumina layer 474 is deposited on the entire wafer. FIG. 29V is an ABS illustration of FIG. 29U. In FIG. 29W the entire wafer is CMP causing the alumina to form a third insulation layer 476 above the second coil layer 462 with front and rear layer portions 478 and 480 which are flush with top surfaces of the top first pole tip 470 and the back gap region 472. FIG. 29X is an ABS illustration of FIG. 29W. In FIG. 29Y a write gap layer 482 is sputter deposited, which is preferably a full film layer over the entire wafer. This will maintain planarization of the partially completed head with respect to the rest of the wafer. FIG. 29Z is an ABS illustration of FIG. 29Y. In FIG. 29AA a second pole piece/first shield layer 484 (P2/S1) is frame plated on the gap layer 482 and is flat because of the flatness of the gap layer. FIG. 29AB is an ABS illustration of FIG. 29AA.

In FIG. 29AC alumina 485 is once again sputter deposited over the entire wafer. FIG. 29AD is an ABS illustration of FIG. 29AC. In FIG. 29AE the entire wafer is CMP to ensure planarization of the second pole piece/first shield layer 484 for forming a first read gap layer thereon. FIG. 29AF is an ABS illustration of FIG. 29AE. Next, the read gap layer 486, read sensor 488 and first and second leads (not shown) are frame plated on the first read gap layer followed by sputter deposition of a second read gap layer 490 and a second shield layer 492. FIG. 29AH is an ABS illustration of FIG. 29AG. The wafer is now ready for an overcoat layer (not shown) which essentially completes the construction of the merged magnetic head.

Figure 30:
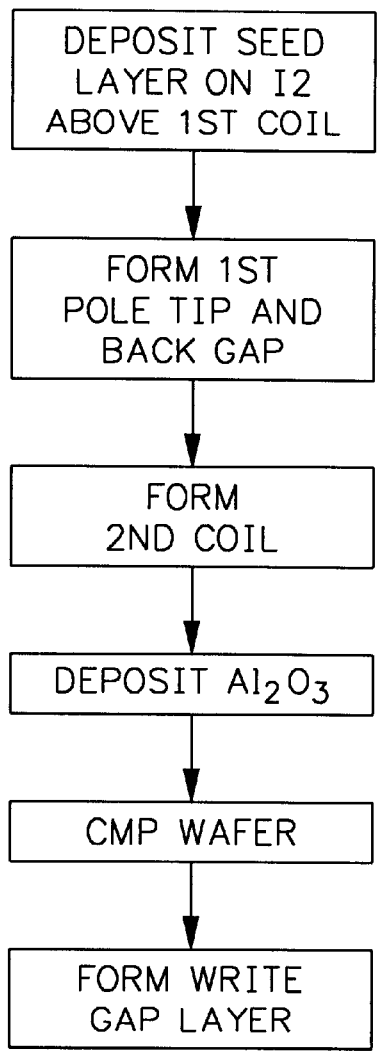
FIG. 30 is a block diagram of another method of the invention.

As stated hereinabove, the steps in regard to the construction of the second coil layer and the first pole tip, shown in FIGS. 29N and 29Q, may be reversed in their order. When these steps are reversed the method would be as shown in FIG. 30. The seedlayer is still deposited as shown in FIG. 29M. The next step would be to form the first pole tip 470 and back gap 472 (FIG. 29Q). Next, the second coil 462 would be formed (FIG. 29N) followed by deposition of the alumina layer over the entire wafer (FIG. 29V). The wafer is then CMP and the write gap layer 482 is formed, as shown in FIG. 29Y.

Figure 31:
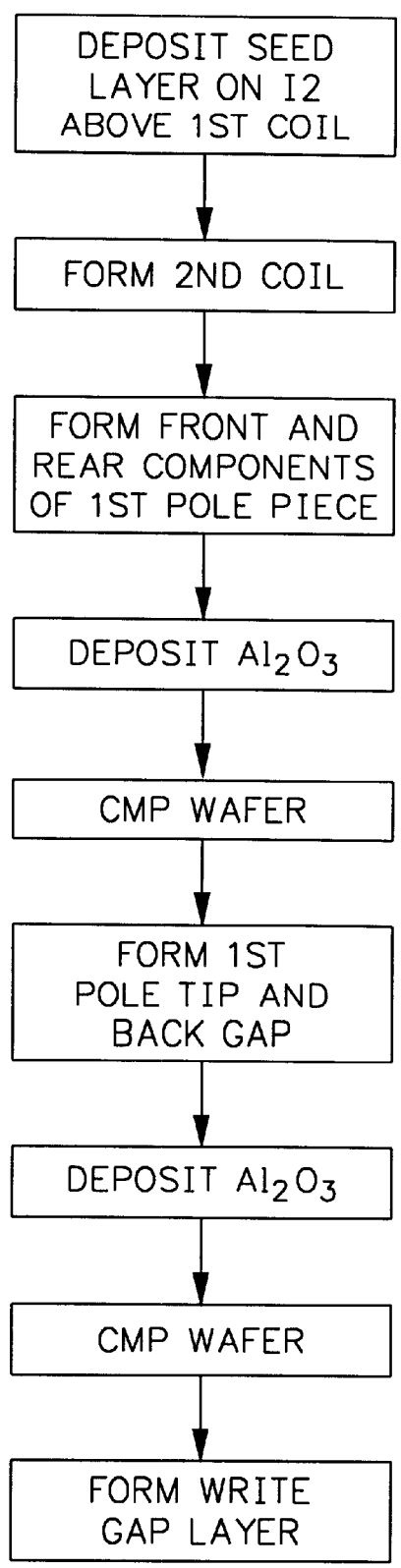
FIG. 31 is a block diagram of a further method of the invention.

FIG. 31 illustrates still another modification of the method. A seedlayer is deposited on the second insulation layer above the first coil, as shown in FIG. 29M, followed by formation of the second coil (FIG. 29N). Next, front and rear components of the first pole piece are formed followed by deposition of alumina over the entire wafer. After CMP the wafer flat until the top surfaces of the front and rear components are exposed, the first pole tip and back gap can then be formed on the front and rear components respectively. Next, an alumina layer is deposited over the entire wafer followed by lapping. The write gap layer can then be deposited, as shown in FIG. 29Y. This modified method would enable construction of the first pole tip and the back gap on an entirely flat wafer without the presence of a coil layer.

Figure 32:
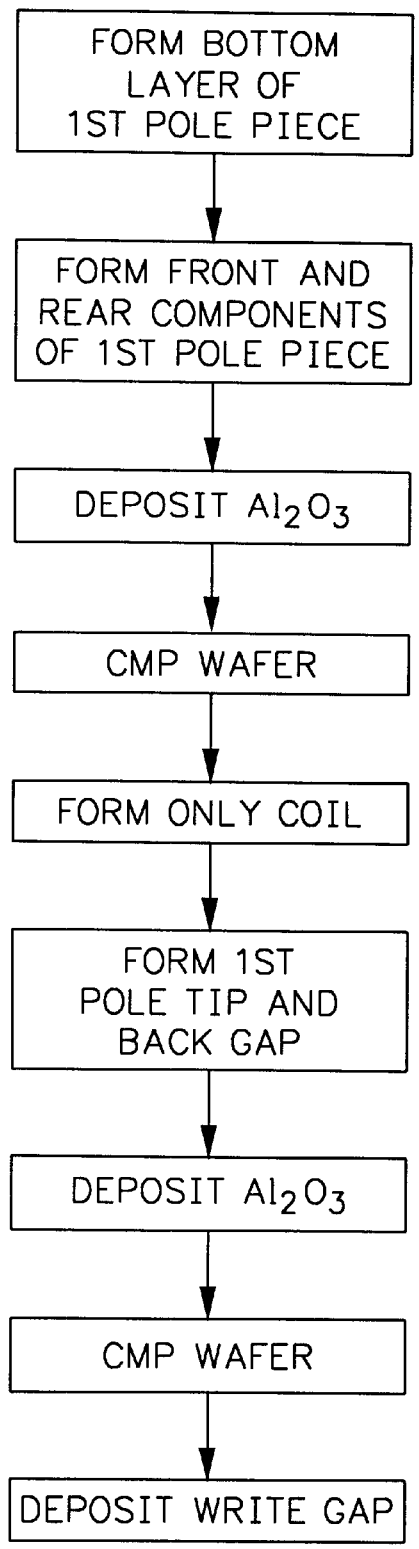
FIG. 32 is a block diagram of yet another method of the invention.

FIG. 32 shows exemplary steps for the construction of the merged magnetic heads shown in FIGS. 19 and 25. The first step is to form a bottom layer of a first pole piece, as shown in FIG. 29A, followed by forming front and rear components of the first pole piece, as shown in FIG. 29B. Next, alumina is deposited followed by CMP the wafer until the top surfaces of the front and rear components are flush with the alumina layer. A single coil layer is then formed followed by formation of the first pole tip and back gap. Alumina is then again deposited and the wafer lapped until the top surfaces of the first pole tip and the back gap are flush with the alumina layer. The write gap can then be deposited, as shown in FIG. 29Y. The remainder of the steps for constructing the read head would be as shown in FIGS. 29AA–29AH. It should be noted that the fifth and sixth steps in FIG. 32 could be reversed so that the first pole tip and back gap are formed before the coil layer. Further, the method could be modified by forming second front and second rear components on the first front and first rear components after construction of the coil layer followed by deposition of alumina and lapping to provide a flat surface for the construction of the first pole tip and back gap.

The construction of the pole tip design shown in FIGS. 16–21 is similar to the method described hereinabove, except the photoresist patterning for the front portions of the first pole piece layer differ slightly in order to obtain the configurations shown. The construction of the single layer embodiments shown in FIGS. 19 and 25 would employ the method described hereinabove except the construction of the second coil layer is omitted.

In some embodiments it may be desirable to employ a high magnetic moment for the first pole tip which may be $Ni_{45}Fe_{55}$. It should be noted from FIGS. 29O–29T that a different material can be employed for the top first pole tip than employed for the remainder of the first pole piece. A top first pole tip constructed of $Ni_{45}Fe_{55}$ can be annealed to improve its properties without damaging the read sensor since it has not yet been constructed. The read sensor can be either a magnetoresistive (MR) sensor or a spin valve sensor which are both well known in the art. In lieu of alumina ($Al_2O_3$) silicon dioxide ($SiO_2$) may be employed. Alumina or silicon dioxide have greater electrical insulating and thermal insulating properties than hard baked photoresist. While it is preferred that the write gap layer be alumina, it should be understood that it may be a nonmagnetic material, such as copper, which is frame plated or sputter deposited. While frame plating is preferable for all of the metallic layers, it should be understood that these layers could be sputter deposited employing bilayer photoresist techniques which are well known in the art. The alumina layers or silicon dioxide layers are preferably sputter deposited. The read gap layers are preferably alumina and the read sensor is preferably constructed of Permalloy ($Ni_{80}Fe_{20}$).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A merged magnetic head that has an air bearing surface (ABS), a top and a bottom and read and write head portions, wherein each read and write head portion has a top and a bottom, the write head portion having pole tip, yoke and back gap regions, the merged magnetic head comprising:

the write head portion including:

first and second pole pieces, the first pole piece having a first pole tip and the second pole piece having a second pole tip;

a write gap layer having only one thickness at the ABS;

the pole tips being separated by the write gap layer in the pole tip region with the thickness of the write gap layer defining only one write gap length between the pole tips at the ABS;

the first and second pole tips being capable of conducting flux to and from the ABS with at least a majority of the flux fringing across said write gap layer at the ABS;

the first and second pole pieces being connected at the back gap region;

an insulation stack having a plurality of insulation layers;

at least one write coil layer embedded in the insulation stack;

the insulation stack being located between the first and second pole pieces in the yoke region; and the first pole tip having a width at the ABS with a portion of the width being immediately adjacent the write gap layer at a location only where the write gap layer defines the gap length and the second pole tip having a width at the ABS immediately adjacent the write gap layer at a location only where the write gap layer defines the gap length;

said width of the first pole tip being less than said width of the second pole tip;

the width of the first pole tip being equal to and defining a track width of the write head portion;

and wherein the surface of the second pole tip which contacts the write gap layer, substantially lies in a single plane over its extent at the ABS such that said single plane extent of said second pole tip surface is of a greater width than said width of said first pole tip;

the read head portion including:

a first shield layer which is a common layer with said second pole piece;

first and second read gap layers on the first shield layer;

a read sensor located between the first and second gap layers; and a second shield layer on the second read gap layer;

a nonmagnetic electrically nonconductive overcoat layer on top of the read head portion and at the top of the merged magnetic head; and the read head portion being located between the write head portion and the overcoat layer.

2. A merged magnetic head as claimed in claim 1 including:

each of the layers of the read and write head portions having major thin film top and bottom surfaces that are spaced by a thickness of the layer;

throughout its entirety, the write gap layer having only flat top and bottom surfaces which are spaced by said gap length and that extend from the ABS to the back gap region; and throughout its entirety, the common layer having only flat top and bottom surfaces that extend from the ABS to the back gap region.

3. A merged magnetic head as claimed in claim 1 wherein each of the first and second pole tips consists of only a rectangular shape at the ABS.

4. A merged magnetic head as claimed in claim 3 including:

each of the layers of the read and write head portions having major thin film top and bottom surfaces that are spaced by a thickness of the layer;

throughout its entirety, the write gap layer having only flat top and bottom surfaces which are spaced by said gap length and that extend from the ABS to the back gap region; and throughout its entirety, the common layer having only flat top and bottom surfaces that extend from the ABS to the back gap region.

5. A magnetic disk drive that includes a merged magnetic head that has an air bearing surface (ABS), a top and a bottom and read and write head portions, wherein each read and write head portion has a top and a bottom, the write head portion having pole tip, yoke and back gap regions, the head comprising:

the write head portion including:

first and second pole pieces, the first pole piece having a first pole tip and the second pole piece having a second pole tip;

a write gap layer having only one thickness;

the pole tips being separated by the write gap layer in the pole tip region with the thickness of the write gap layer defining only one write gap length between the pole tips at the ABS;

the first and second pole tips being capable of conducting flux to and from the ABS with at least a majority of the flux fringing across said write gap layer at the ABS;

the first and second pole pieces being connected at the back gap region;

an insulation stack having a plurality of insulation layers;

at least one write coil layer embedded in the insulation stack;

the insulation stack being located between the first and second pole pieces in the yoke region; and the first pole tip having a width at the ABS with a portion of the width being immediately adjacent the write gap layer at a location only where the write gap layer defines the gap length and the second pole tip having a width at the ABS immediately adjacent the write gap layer at a location only where the write gap layer defines the gap length;

said width of the first pole tip being less than said width of the second pole tip;

the width of the first pole tip being equal to and defining a track width of the write head portion;

and wherein the surface of the second pole tip which contacts the write gap layer, substantially lies in a single plane over its extent at the ABS such that said single plane extent of said second pole tip surface is of a greater width than said width of said first pole tip;

the read head portion including:

a first shield layer which is a common layer with said second pole piece;

first and second read gap layers on the first shield layer;

a read sensor located between the first and second gap layers; and a second shield layer on the second read gap layer;

a nonmagnetic electrically nonconductive overcoat layer on top of the read head portion and at the top of the merged magnetic head; and the read head portion being located between the write head portion and the overcoat layer;

a frame;

a magnetic disk rotatably supported on the frame;

a support mounted on the frame for supporting the head in a transducing relationship with the magnetic disk, means for rotating the magnetic disk;

positioning means connected to the support for moving the head to multiple positions with respect to said magnetic disk; and means connected to the head, to the means for rotating the magnetic disk and to the positioning means for exchanging signals with the head, for controlling movement of the magnetic disk and for controlling the position of the head.

6. A magnetic disk drive as claimed in claim 5 including:
each of the layers of the read and write head portions having major thin film top and bottom surfaces that are spaced by a thickness of the layer;
throughout its entirety, the write gap layer having only flat top and bottom surfaces which are spaced by said gap length and that extend from the ABS to the back gap region; and
throughout its entirety, the common layer having only flat top and bottom surfaces that extend from the ABS to the back gap region.

7. A magnetic disk drive as claimed in claim 6 wherein each of the first and second pole tips consists of only a rectangular shape at the ABS.

8. A magnetic disk drive as claimed in claim 7 including:
the front surface of the top second pole tip having a substantially flat central portion that is substantially centered with respect to the top first pole tip and having first and second side wing portions that each has a bottom surface that slopes upwardly from the central portion at an angle less than 90°.

9. A magnetic disk drive as claimed in claim 6 including:
the front surface of the second pole tip having a substantially flat central portion that is substantially centered with respect to the top first pole tip and having first and second side wing portions that each has a bottom surface that slopes upwardly from the central portion at an angle less than 90°.

10. A merged magnetic head that has an air bearing surface (ABS), a top and a bottom and read and write head portions with the read head portion being located on top of the write head portion, the write head portion having pole tip, yoke and back gap regions, the merged magnetic head comprising:
the write head portion including:
first and second pole pieces, the first pole piece having a first pole tip and the second pole piece having a second pole tip;
at least a portion of a write gap layer;
the pole tips being separated by said at least a portion of the gap layer in the pole tip region and the first and second pole pieces being connected in the back gap region;
said at least a portion of the write gap layer having only one thickness at said ABS which defines only one write gap length between the first and second pole tips at the ABS;
the first and second pole tips being capable of conducting flux to and from the ABS with at least a majority of the flux fringing across said write gap layer at the ABS;
an insulation stack having a plurality of insulation layers;
at least one write coil layer embedded in the insulation stack; and
the insulation stack being located between the first and second pole pieces in the yoke region;
the read head portion including:
a first shield layer which is a common layer with said second pole piece;
first and second read gap layers on the first shield layer;
a read sensor located between the first and second gap layers, and
a second shield layer on the second read gap layer;
a nonmagnetic electrically nonconductive overcoat layer on top of the read head portion;
the read head portion being located between the write head portion and the overcoat layer;
the second pole tip being located between the first pole tip and the read head portion; and
said at least a portion of the write gap layer having only one width at the ABS;
the first pole tip having a width at the ABS that is equal to the width of said at least a portion of the write gap layer at the ABS and the second pole tip having a width that is greater than said at least a portion of the write gap layer at the ABS so that the first pole tip is equal to and defines a track width of the write head portion;
and wherein the surface of the second pole tip which contacts the write gap layer, substantially lies in a single plane over its extent at the ABS such that said single plane extent of said second pole tip surface is of a greater width than said width of said first pole tip.

11. A merged magnetic head that has an air bearing surface (ABS), a top and a bottom and read and write head portions, the write head portion having pole tip, yoke and back gap regions, the merged magnetic head comprising:
the write head portion including:
first and second pole piece layers, the first pole piece layer having a first pole tip and the second pole piece layer having a second pole tip;
a write gap layer;
the pole tips being separated by the gap layer in the pole tip region and the first and second pole piece layers being connected in the back gap region;
an insulation stack having a plurality of insulation layers;
at least one write coil layer embedded in the insulation stack; and
the insulation stack being located between the first and second pole piece layers in the yoke region;
the read head portion including:
a first shield layer which is a common layer with said second pole piece layer;
first and second read gap layers on the first shield layer;
a read sensor located between the first and second gap layers; and
a second shield layer on the second read gap layer;
a nonmagnetic electrically nonconductive overcoat layer on top of the second shield layer;
the read head portion being located between the write head portion and the overcoat layer;
each of the first and second pole tips having only one width at the ABS;
said width of the first pole tip being less than the width of the second pole tip so that the first pole tip defines a track width of the write head; and
the write gap layer having only one width at the ABS that is equal to said width of the first pole tip at the ABS;
and wherein the surface of the second pole tip which contacts the write gap layer, substantially lies in a single plane over its extent at the ABS such that said single plane extent of said second pole tip surface is of a greater width than said width of said first pole tip.

* * * * *